(12) United States Patent
Liu et al.

(10) Patent No.: US 12,513,724 B2
(45) Date of Patent: Dec. 30, 2025

(54) PHYSICAL DOWNLINK CONTROL CHANNEL RESOURCES FOR REDUCED CAPABILITY USER EQUIPMENT

(71) Applicant: QUALCOMM Incorporated, San Diego, CA (US)

(72) Inventors: Le Liu, Fremont, CA (US); Alberto Rico Alvarino, San Diego, CA (US); Huilin Xu, San Diego, CA (US); Seyedkianoush Hosseini, San Diego, CA (US); Peter Pui Lok Ang, San Diego, CA (US); Tingfang Ji, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 17/031,285

(22) Filed: Sep. 24, 2020

(65) Prior Publication Data

US 2021/0100003 A1 Apr. 1, 2021

Related U.S. Application Data

(60) Provisional application No. 62/907,469, filed on Sep. 27, 2019.

(51) Int. Cl.
*H04W 72/23* (2023.01)
*H04W 8/24* (2009.01)
(Continued)

(52) U.S. Cl.
CPC ............ *H04W 72/53* (2023.01); *H04W 8/24* (2013.01); *H04W 24/08* (2013.01); *H04W 72/0446* (2013.01); *H04W 72/23* (2023.01)

(58) Field of Classification Search
CPC ... H04W 72/0493; H04W 8/24; H04W 24/08; H04W 72/042; H04W 72/0446;
(Continued)

(56) References Cited

U.S. PATENT DOCUMENTS

2012/0063351 A1* 3/2012 Kim ...................... H04L 5/0053
370/252
2012/0176987 A1* 7/2012 Kaminski ........... H04W 72/569
370/329
(Continued)

FOREIGN PATENT DOCUMENTS

| CN | 109347611 A | 2/2019 |
|---|---|---|
| CN | 109906576 A | 6/2019 |
| WO | WO-2018128468 A1 | 7/2018 |

OTHER PUBLICATIONS

Xu et al., "Bandwidth part switching for sidelink communication", U.S. Appl. No. 62/877,029, filed Jul. 22, 2019 (Year: 2019).*
(Continued)

*Primary Examiner* — Thinh D Tran
(74) *Attorney, Agent, or Firm* — Holland & Hart LLP

(57) ABSTRACT

Methods, systems, and devices for wireless communications are described. A user equipment (UE) may transmit a UE capability message to a base station, the UE capability message including an indication of a UE type, the UE type associated with at least one of a reduced bandwidth, or a reduced number of antennas, or a combination thereof, for the UE. The UE may monitor, based at least in part on a control resource set that is based at least in part on the UE type, a control channel for a downlink grant for downlink resources. The UE may receive, based at least in part on the monitoring, a grant identifying the downlink resources for communicating with the base station. The UE may communicate with the base station using the identified downlink resources.

25 Claims, 21 Drawing Sheets

(51) Int. Cl.
*H04W 24/08* (2009.01)
*H04W 72/0446* (2023.01)
*H04W 72/53* (2023.01)

(58) Field of Classification Search
CPC ............... H04W 72/14; H04W 72/048; H04W 72/0406; H04W 72/0453; H04W 72/53; H04W 72/23; H04W 72/51; H04W 72/20; H04W 72/1273; H04L 5/0094; H04L 5/0044; H04L 5/0053; H04B 7/0695
See application file for complete search history.

(56) References Cited

U.S. PATENT DOCUMENTS

| | | | | |
|---|---|---|---|---|
| 2013/0088973 | A1* | 4/2013 | Yang | H04L 5/003 370/241 |
| 2013/0195068 | A1* | 8/2013 | Baker | H04L 5/0023 370/330 |
| 2017/0230951 | A1* | 8/2017 | Xiong | H04W 48/12 |
| 2018/0227907 | A1* | 8/2018 | Hosseini | H04W 72/12 |
| 2018/0279210 | A1* | 9/2018 | Sun | H04W 72/23 |
| 2018/0287762 | A1 | 10/2018 | Sun et al. | |
| 2019/0020506 | A1 | 1/2019 | Cheng et al. | |
| 2019/0053081 | A1* | 2/2019 | Bagheri | H04L 63/1416 |
| 2019/0229879 | A1* | 7/2019 | Yi | H04W 24/08 |
| 2019/0268206 | A1* | 8/2019 | Yang | H04L 5/001 |
| 2019/0334687 | A1* | 10/2019 | Su | H04L 5/0053 |
| 2020/0008231 | A1* | 1/2020 | Vilaipornsawai | H04W 72/21 |
| 2020/0229270 | A1* | 7/2020 | Chatterjee | H04W 72/23 |
| 2020/0267788 | A1* | 8/2020 | Nammi | H04L 5/0053 |
| 2021/0028912 | A1* | 1/2021 | Xu | H04W 72/0446 |
| 2021/0314114 | A1* | 10/2021 | Seo | H04L 1/0071 |
| 2021/0329444 | A1* | 10/2021 | Wiemann | H04W 8/24 |
| 2022/0070909 | A1* | 3/2022 | Takeda | H04L 5/0053 |
| 2023/0217504 | A1* | 7/2023 | Xiong | H04W 74/0891 370/329 |

OTHER PUBLICATIONS

Wiemann et al., "Incremental UE Capability ID", the U.S. Appl. No. 62/737,745, filed Sep. 27, 2018 (Year: 2018).*
International Search Report and Written Opinion—PCT/US2020/052713—ISA/EPO—Dec. 15, 2020 (195318WO).
European Search Report—EP23190116—Search Authority—The Hague—Nov. 3, 2023 (195318EPD1).
Intel Corporation: "Discussion on UE Complexity Reduction for eMTC", R1-143768, 3rd Generation Partnership Project, Mobile Competence Centre, 650, Route Des Lucioles, F-06921 Sophia-Antipolis Cedex, France, vol. RAN WG1, No. Ljubljana, Slovenia, Oct. 6, 2014-Oct. 10, 2014, Sep. 27, 2014, 6 Pages, XP050869454, Section 6.3 Reduced physical control channel processing.

* cited by examiner

Slot Configuration 205

4 Symbols

Slot Configuration 210

6 Symbols

Slot Configuration 215

8 Symbols

Slot Configuration 220

12 Symbols

CORESET 225

200

CCE-to-REG Bundling 305

L=4 or 12
No Interleaving

L=6
No Interleaving

CCE-to-REG Bundling 310

L=4
No Interleaving

L=4, R=3
With Interleaving

CCE-to-REG Bundling 315

L=6
No Interleaving

L=6, R=2
With Interleaving

REG Bundle #0 320

REG Bundle #1 325

REG Bundle #2 330

REG Bundle #3 335

300

Slot Configuration
405

Slot Configuration
410

PDCCH
415

PDCCH
Repetition
420

400

Slot Configuration
505

Slot Configuration
510

PDCCH
515

PDCCH
Repetition
520

500

Slot Configuration
605

Slot Configuration
610

PDCCH
615

PDCCH Repetition
620

— 600

CORESET #1  CORESET #2
   810         815

PHYSICAL DOWNLINK CONTROL CHANNEL RESOURCES FOR REDUCED CAPABILITY USER EQUIPMENT

CROSS REFERENCE

The present application for Patent claims the benefit of U.S. Provisional Patent Application No. 62/907,469 by LIU et al., entitled "PHYSICAL DOWNLINK CONTROL CHANNEL RESOURCES FOR REDUCED CAPABILITY USER EQUIPMENT," filed Sep. 27, 2019, assigned to the assignee hereof, and expressly incorporated by reference herein.

TECHNICAL FIELD

The following relates generally to wireless communications, and more specifically to physical downlink control channel (PDCCH) resources for reduced capability user equipment (UE).

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support physical downlink control channel (PDCCH) resources for reduced capability user equipment (UE). Generally, the described techniques provide for various mechanisms to ensure adequate scheduling for a UE type having a reduced number of antennas, a reduced bandwidth, and the like. For example, the UE type may be associated with a limited bandwidth, low complexity, low transmit power levels, a fewer number of receive antennas, an extended battery life, and the like. The UE may transmit or otherwise provide a UE capability message carrying or otherwise conveying an indication of the UE type. The UE capability message may be transmitted to a base station in general, although it is to be understood that the UE capability message may be provided to a network entity in some situations (e.g., when the UE is operating in an idle mode). Based on the UE type indicated in the UE capability message, the base station and UE both know that the UE type is associated with, for example, reduced bandwidth, reduced number of antennas, low complexity, or low transmit power level. The base station (or network entity when the UE is operating in the idle mode) may identify or otherwise select a control resource set (e.g., CORESET) based on the UE type indicated in the UE capability message. Although a number of different control resource set configurations are described herein, the control resource set selected by the base station may improve the control channel (e.g., physical downlink control channel (PDCCH)) link performance for reduced capability UEs, such as new radio (NR)-Light UEs (e.g., reduced capability NR UEs) having a limited bandwidth. The control resource set selected by the base station may generally be for control channel (e.g., PDCCH) used for communicating control information (e.g., a downlink control information (DCI) grant) to the UE. Accordingly, the base station may transmit or otherwise provide a grant to the UE identifying downlink resources for communicating with the UE. A grant may be transmitted to the UE according to the selected control resource set. The base station and UE may communicate using the resources identified in the grant.

A method of wireless communication at a UE is described. The method may include transmitting a UE capability message to a base station, the UE capability message including an indication of a UE type, the UE type associated with at least one of a reduced bandwidth, or a reduced number of antennas, or a combination thereof, for the UE, monitoring, based on a control resource set that is based on the UE type, a control channel for a downlink grant for downlink resources, receiving, based on the monitoring, a grant identifying the downlink resources for communicating with the base station, and communicating with the base station using the identified downlink resources.

An apparatus for wireless communication at a UE is described. The apparatus may include a processor, memory coupled (e.g., operatively, communicatively, functionally, electronically, or electrically) with the processor, and instructions stored in the memory. The instructions may be executable by the processor to cause the apparatus to transmit a UE capability message to a base station, the UE capability message including an indication of a UE type, the UE type associated with at least one of a reduced bandwidth, or a reduced number of antennas, or a combination thereof, for the UE, monitor, based on a control resource set that is based on the UE type, a control channel for a downlink grant for downlink resources, receive, based on the monitoring, a grant identifying the downlink resources for communicating with the base station, and communicate with the base station using the identified downlink resources.

Another apparatus for wireless communication at a UE is described. The apparatus may include means for transmitting a UE capability message to a base station, the UE capability message including an indication of a UE type, the UE type associated with at least one of a reduced bandwidth, or a reduced number of antennas, or a combination thereof, for the UE, monitoring, based on a control resource set that is based on the UE type, a control channel for a downlink grant for downlink resources, receiving, based on the monitoring, a grant identifying the downlink resources for communicating with the base station, and communicating with the base station using the identified downlink resources.

A non-transitory computer-readable medium storing code for wireless communication at a UE is described. The code may include instructions executable by a processor to transmit a UE capability message to a base station, the UE capability message including an indication of a UE type, the UE type associated with at least one of a reduced bandwidth, or a reduced number of antennas, or a combination thereof, for the UE, monitor, based on a control resource set that is based on the UE type, a control channel for a downlink grant for downlink resources, receive, based on the monitoring, a grant identifying the downlink resources for communicating with the base station, and communicate with the base station using the identified downlink resources.

Some examples of the method, apparatuses, and non-transitory computer-readable medium described herein may further include operations, features, means, or instructions for identifying a number of control channel elements (CCEs) using a set of different aggregation levels (ALs) in the control resource set, and selecting an AL to receive the grant based on the UE type.

Some examples of the method, apparatuses, and non-transitory computer-readable medium described herein may further include operations, features, means, or instructions for identifying a number of CCEs using a set of different ALs in the control resource set, and selecting a number of symbols in a slot for the control channel to receive the grant based on the number of CCEs, where the number of symbols includes three or more symbols in the slot.

Some examples of the method, apparatuses, and non-transitory computer-readable medium described herein may further include operations, features, means, or instructions for reducing a bandwidth of the control channel for the UE based on the UE type.

In some examples of the method, apparatuses, and non-transitory computer-readable medium described herein, the number of selected symbols in the slot may be an integer division of a number of resource element groups (REGs) for the CCEs.

Some examples of the method, apparatuses, and non-transitory computer-readable medium described herein may further include operations, features, means, or instructions for selecting an REG bundling size based on a number of symbols for the control resource set.

Some examples of the method, apparatuses, and non-transitory computer-readable medium described herein may further include operations, features, means, or instructions for receiving, based on the control resource set, the grant during a first set of symbols of a slot, and receiving, based on the control resource set, a repetition of the grant during a second set of symbols of the slot, the first set of symbols and the second set of symbols including contiguous or non-contiguous symbols of the slot.

In some examples of the method, apparatuses, and non-transitory computer-readable medium described herein, the repetition of the grant in the second set of symbols may be received using a same parameter set as the grant in received in the first set of symbols.

Some examples of the method, apparatuses, and non-transitory computer-readable medium described herein may further include operations, features, means, or instructions for receiving, based on the control resource set, a first portion of the grant during a first slot, and receiving, based on the control resource set, a second portion of the grant during a second slot that may be different from the first slot.

Some examples of the method, apparatuses, and non-transitory computer-readable medium described herein may further include operations, features, means, or instructions for receiving, based on the control resource set, the grant during a first slot, and receiving, based on the control resource set, a repetition of the grant during a second slot that may be different from the first slot.

Some examples of the method, apparatuses, and non-transitory computer-readable medium described herein may further include operations, features, means, or instructions for receiving, based on the control resource set, the grant during a first slot and using a first set of subbands of a bandwidth part, and receiving, based on the control resource set, a repetition of the grant during a second slot that may be different from the first slot and using a second set of subbands of the bandwidth part that may be different from the first set of subbands.

In some examples of the method, apparatuses, and non-transitory computer-readable medium described herein, the repetition of the grant during the second slot may be based at least in part on a resource block offset configured according to the control resource set.

Some examples of the method, apparatuses, and non-transitory computer-readable medium described herein may further include operations, features, means, or instructions for receiving, based on the control resource set, the grant during a first slot and using a first bandwidth part, and receiving, based on the control resource set, a repetition of the grant during a second slot that may be different from the first slot and using a second bandwidth part that may be different from the first bandwidth part.

In some examples of the method, apparatuses, and non-transitory computer-readable medium described herein, the repetition of the grant using the second bandwidth part may be based at least in part on a bandwidth part offset configured according to the control resource set.

Some examples of the method, apparatuses, and non-transitory computer-readable medium described herein may further include operations, features, means, or instructions for performing a retuning operation from the first bandwidth part to the second bandwidth part during a configured retuning gap configured not during a first symbol of the second slot.

Some examples of the method, apparatuses, and non-transitory computer-readable medium described herein may further include operations, features, means, or instructions for receiving, based on a first control resource set, a first portion of the grant, receiving, based on a second control resource set that may be different from the first control resource set, a second portion of the grant, and combining the first portion of the grant and the second portion of the grant to receive the grant.

In some examples of the method, apparatuses, and non-transitory computer-readable medium described herein, the first control resource set may be associated with a first slot and the second control resource set may be associated with a second slot that may be different from the first slot.

A method of wireless communication at a base station is described. The method may include receiving a UE capability message from a UE, the UE capability message including an indication of a UE type, the UE type associated with at least one of a reduced bandwidth, or a reduced number of antennas, or a combination thereof, for the UE, selecting, based on the UE type, a control resource set for a control channel for the UE to monitor, transmitting a grant identifying downlink resources for communicating with the UE according to the control resource set, and communicating with the UE using the identified downlink resources.

An apparatus for wireless communication at a base station is described. The apparatus may include a processor, memory coupled (e.g., operatively, communicatively, functionally, electronically, or electrically) with the processor, and instructions stored in the memory. The instructions may be executable by the processor to cause the apparatus to receive a UE capability message from a UE, the UE capability message including an indication of a UE type, the UE type associated with at least one of a reduced bandwidth, or a reduced number of antennas, or a combination thereof, for the UE, select, based on the UE type, a control resource set for a control channel for the UE to monitor, transmit a grant identifying downlink resources for communicating with the UE according to the control resource set, and communicate with the UE using the identified downlink resources.

Another apparatus for wireless communication at a base station is described. The apparatus may include means for receiving a UE capability message from a UE, the UE capability message including an indication of a UE type, the UE type associated with at least one of a reduced bandwidth, or a reduced number of antennas, or a combination thereof, for the UE, selecting, based on the UE type, a control resource set for a control channel for the UE to monitor, transmitting a grant identifying downlink resources for communicating with the UE according to the control resource set, and communicating with the UE using the identified downlink resources.

A non-transitory computer-readable medium storing code for wireless communication at a base station is described. The code may include instructions executable by a processor to receive a UE capability message from a UE, the UE capability message including an indication of a UE type, the UE type associated with at least one of a reduced bandwidth, or a reduced number of antennas, or a combination thereof, for the UE, select, based on the UE type, a control resource set for a control channel for the UE to monitor, transmit a grant identifying downlink resources for communicating with the UE according to the control resource set, and communicate with the UE using the identified downlink resources.

Some examples of the method, apparatuses, and non-transitory computer-readable medium described herein may further include operations, features, means, or instructions for identifying a number of CCEs using a set of different ALs in the control resource set, and selecting an AL to transmit the grant based on the UE type.

Some examples of the method, apparatuses, and non-transitory computer-readable medium described herein may further include operations, features, means, or instructions for identifying a number of CCEs using a set of different ALs in the control resource set, and selecting a number of symbols in a slot for the control channel to transmit the grant based on the number of CCEs, where the number of symbols includes three or more symbols in the slot.

Some examples of the method, apparatuses, and non-transitory computer-readable medium described herein may further include operations, features, means, or instructions for reducing a bandwidth of the control channel for the UE based on the UE type.

In some examples of the method, apparatuses, and non-transitory computer-readable medium described herein, the number of selected symbols in the slot may be an integer division of a number of REGs for the CCEs.

Some examples of the method, apparatuses, and non-transitory computer-readable medium described herein may further include operations, features, means, or instructions for selecting a REG bundling size based on a number of symbols for the control resource set.

Some examples of the method, apparatuses, and non-transitory computer-readable medium described herein may further include operations, features, means, or instructions for transmitting, based on the control resource set, the grant during a first set of symbols of a slot, and transmitting, based on the control resource set, a repetition of the grant during a second set of symbols of the slot, the first set of symbols and the second set of symbols including contiguous or non-contiguous symbols of the slot.

In some examples of the method, apparatuses, and non-transitory computer-readable medium described herein, the repetition of the grant in the second set of symbols may be transmitted using a same parameter set as the grant transmitted in the first set of symbols.

Some examples of the method, apparatuses, and non-transitory computer-readable medium described herein may further include operations, features, means, or instructions for transmitting, based on the control resource set, a first portion of the grant during a first slot, and transmitting, based on the control resource set, a second portion of the grant during a second slot that may be different from the first slot.

Some examples of the method, apparatuses, and non-transitory computer-readable medium described herein may further include operations, features, means, or instructions for transmitting, based on the control resource set, the grant during a first slot, and transmitting, based on the control resource set, a repetition of the grant during a second slot that may be different from the first slot.

Some examples of the method, apparatuses, and non-transitory computer-readable medium described herein may further include operations, features, means, or instructions for transmitting, based on the control resource set, the grant during a first slot and using a first set of subbands of a bandwidth part, and transmitting, based on the control resource set, a repetition of the grant during a second slot that may be different from the first slot and using a second set of subbands of the bandwidth part that may be different from the first set of subbands.

In some examples of the method, apparatuses, and non-transitory computer-readable medium described herein, the repetition of the grant during the second slot may be based at least in part on a resource block offset configured according to the control resource set.

Some examples of the method, apparatuses, and non-transitory computer-readable medium described herein may further include operations, features, means, or instructions for transmitting, based on the control resource set, the grant during a first slot and using a first bandwidth part, and transmitting, based on the control resource set, a repetition of the grant during a second slot that may be different from the first slot and using a second bandwidth part that may be different from the first bandwidth part.

In some examples of the method, apparatuses, and non-transitory computer-readable medium described herein, the repetition of the grant using the second bandwidth part may be based at least in part on a bandwidth part offset configured according to the control resource set.

Some examples of the method, apparatuses, and non-transitory computer-readable medium described herein may further include operations, features, means, or instructions for configuring a retuning gap during not during a first symbol of the second slot for the UE to perform a retuning operation from the first bandwidth part to the second bandwidth part.

Some examples of the method, apparatuses, and non-transitory computer-readable medium described herein may further include operations, features, means, or instructions for transmitting, based on a first control resource set, a first portion of the grant, and transmitting, based on a second control resource set that may be different from the first control resource set, a second portion of the grant, where the first portion of the grant and the second portion of the grant may be combined to transmit the grant.

In some examples of the method, apparatuses, and non-transitory computer-readable medium described herein, the first control resource set may be associated with a first slot and the second control resource set may be associated with a second slot that may be different from the first slot.

DETAILED DESCRIPTION

Figure 1:
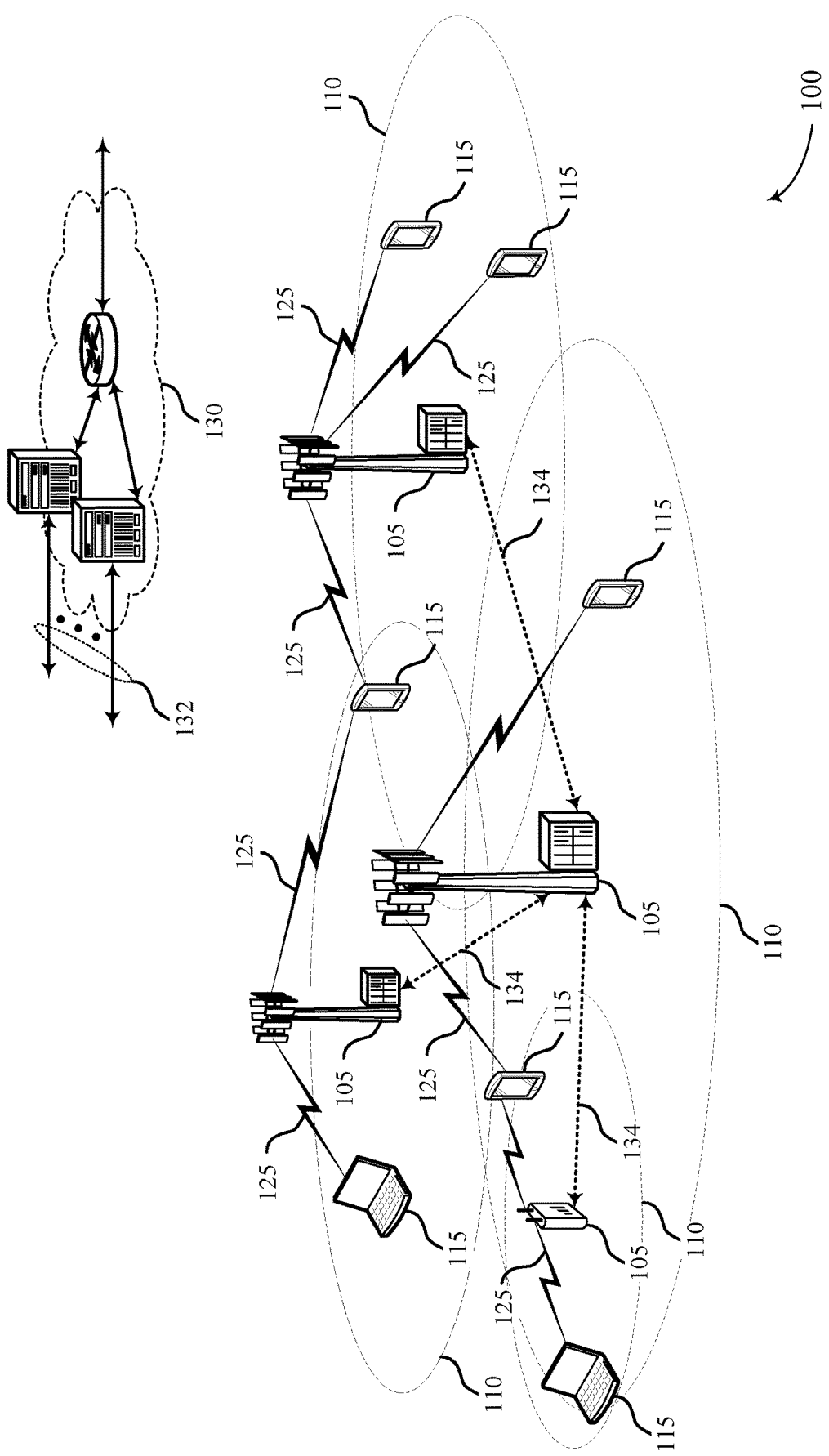
FIG. 1 illustrates an example of a system for wireless communications that supports physical downlink control channel (PDCCH) resources for reduced capability user equipment (UE) in accordance with aspects of the present disclosure.

Some wireless communication systems use frequency and/or time domain diversity to support increased system performance and throughput. For example, such wireless communication systems may utilize various techniques, alone or in combination, to improve system capacity and performance. Such techniques include, but are not limited to, non-contiguous resource blocks (RBs) within a wide bandwidth part (BWP), distributed resource allocation within a wide BWP, multi-slot aggregation for physical downlink shared channel (PDSCH), and the like. These wireless communication systems typically do not support frequency hopping. However, advances in technology also give rise to user equipment (UE) of a certain UE type that may not be able to use some or all of such advance techniques. For example, some UE types are associated with a limited or reduced bandwidth, low complexity level, low transmit maximum power level, a reduced number of antennas, or an extended battery life. Such UE types may include wearable devices, internet-of-things (IoT) devices, machine-type communication (MTC) devices, and the like.

Aspects of the disclosure are initially described in the context of a wireless communication system. Generally, the described techniques provide for various mechanisms to ensure adequate scheduling for a UE type having a reduced number of antennas, a reduced bandwidth, and the like. For example, the UE type may be associated with a limited bandwidth, low complexity, low transmit power levels, a fewer number of receive antennas, an extended battery life, and the like. The UE may transmit or otherwise provide a UE capability message carrying or otherwise conveying an indication of the UE type. The UE capability message may be transmitted to a base station in general, although it is to be understood that the UE capability message may be provided to a network entity in some situations (e.g., when the UE is operating in an idle mode).

The UE capability message may be a radio resource control (RRC) layer message that the UE sends to the base station or other network entity, for example during an initial registration process. The UE capability message may detail the capabilities or attributes of the UE and features supported by the UE using a set of defined or standardized information elements or other fields.

Based on the UE type indicated in the UE capability message, the base station and UE both know that the UE type is associated with, for example, the reduced bandwidth, reduced number of antennas, low complexity, or low transmit power level. The base station (or network entity if the UE is operating in the idle mode) may identify or otherwise select a control resource set (e.g., CORESET) based on the UE type indicated in the UE capability message. Although a number of different control resource set configurations are described herein, the control resource set selected by the base station may improve the control channel (e.g., physical downlink control channel (PDCCH)) link performance for reduced capability UEs, such as new radio (NR)-Light UEs (which may also be referred to as reduced capability NR UEs) having a limited bandwidth. The control resource set selected by the base station may generally be for the control channel (e.g., PDCCH) used for communicating control information (e.g., a downlink control information (DCI) grant) to the UE. Accordingly, the base station may transmit or otherwise provide a grant to the UE identifying resources for communicating with the UE. The grant may be transmitted to the UE according to the selected control resource set. The base station and UE may communicate using the resources identified in the grant.

Aspects of the disclosure are further illustrated by and described with reference to apparatus diagrams, system diagrams, and flowcharts that relate to PDCCH resources for reduced capability UE.

FIG. 1 illustrates an example of a wireless communication system 100 that support PDCCH resources for reduced capability UE in accordance with aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a NR network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNodeB or gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT) and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as Tf=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may transmit a UE capability message to a base station 105, the UE capability message including an indication of a UE type, the UE type associated with at least one of a reduced bandwidth, or a reduced number of antennas, or a combination thereof, for the UE. The UE 115 may monitor, based at least in part on a control resource set that is based at least in part on the UE type, a control channel (e.g., PDCCH) for a downlink grant for downlink resources. The UE 115 may receive, based at least in part on the monitoring, a grant identifying the downlink resources for communicating with the base station 105. The UE 115 may communicate with the base station 105 using the identified downlink resources.

A base station 105 may receive a UE capability message from a UE 115, the UE capability message including an indication of a UE type, the UE type associated with at least one of a reduced bandwidth, or a reduced number of antennas, or a combination thereof, for the UE 115. The base station 105 may select, based at least in part on the UE type, a control resource set for a control channel for the UE 115 to monitor. The base station 105 may transmit a grant identifying downlink resources for communicating with the UE 115 according to the control resource set. The base station 105 may communicate with the UE 115 using the identified downlink resources.

Although these techniques are described as being performed by a base station 105, it is to be understood that references to the base station 105 performing features in the context of the described techniques may actually be implemented by a base station 105 and/or a network entity, such as an MME. In one example this may include the base station 105 (e.g., gNB) performing the described techniques when the UE 115 is operating in an RRC connected mode and the network entity (e.g., MME) performing the described techniques when the UE 115 is operating in an RRC idle or inactive mode. In another example, the UE 115 may report the capability to a network entity (e.g., to the MME through non-access stratum (NAS) signaling). The base station 105 may then perform these techniques for the UE 115 based on the related information obtained by the network entity.

Figure 2:
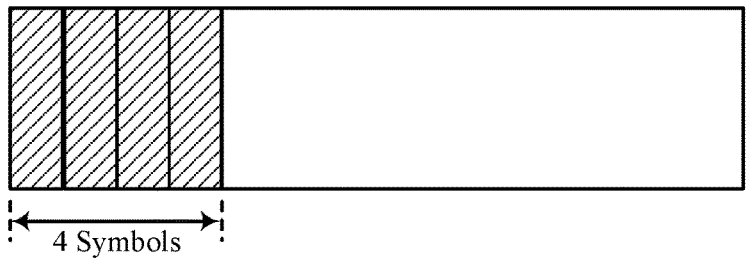
FIG. 2 illustrates a set of example slot configurations that support PDCCH resources for reduced capability UE in accordance with aspects of the present disclosure.
Figure 2:
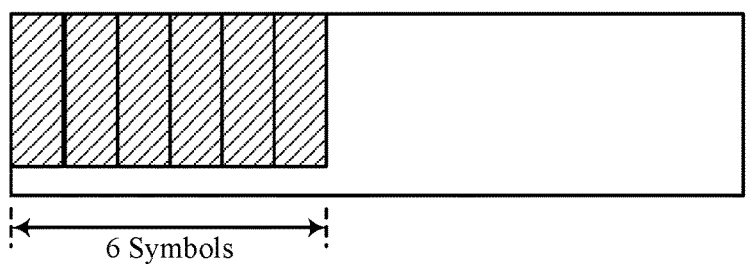
Figure 2:
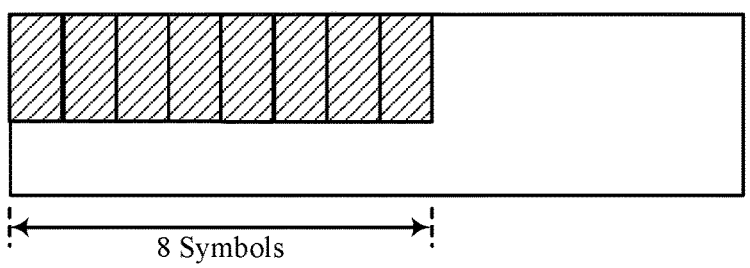
Figure 2:
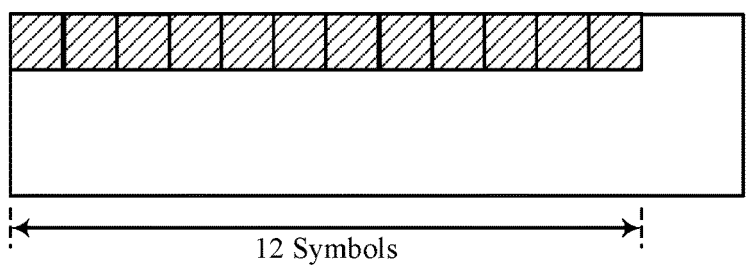
Figure 2:
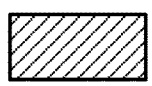

FIG. 2 illustrates a set of example slot configurations 200 that support PDCCH resources for reduced capability UE in accordance with aspects of the present disclosure. In some examples, the set of example slot configurations 200 may implement aspects of wireless communication system 100. Aspects of the set of example slot configurations 200 may be implemented by a UE, base station, and/or a network entity (e.g., MME), which may be examples of corresponding devices described herein. In particular, aspects of the set of example slot configurations 200 may be implemented by a base station when the UE is operating in an RRC connected mode and/or implemented in a network entity (e.g., MME) when the UE is operating in an RRC inactive or RRC idle mode. In another example, the UE 115 may report the capability to a network entity (e.g., to the MME through NAS signaling). The base station 105 may then perform these techniques for the UE 115 based on the related information obtained by the network entity. Broadly, the set of example slot configurations 200 illustrates four examples of slot configurations for PDCCH enhancements that support a UE type having (or associated with) a reduced capability.

Some wireless communication systems may utilize various diversity techniques to improve system throughput and performance. The diversity techniques may be in the frequency domain, a spatial domain, and/or the time domain. In the frequency domain, this may include configuring non-contiguous RBs within a wide BWP, using a distributed resource allocation within a wide BWP to achieve the frequency diversity over a wide bandwidth. In the time domain, this may include using a multi-slot aggregation for PDSCH. Multi-slot repetition may be on the same symbol allocation spread across an aggregation factor (e.g., pdsch-AggregationFactor {2, 4, or 8}) in consecutive slots, e.g., for combining. However, such techniques may be problematic for certain reduced capability UEs, e.g., certain UE types. For example, some such techniques may use a relatively wide bandwidth or a relatively long transmission time, which may not be beneficial for power saving in certain UE types. While some UE types support such techniques, other UE types may not (or at least may not fully support such techniques).

For example, some UE types may be associated with a reduced or limited bandwidth (e.g., 5 MHz/10 MHz/20 MHz, which may be greater than a synchronization signal block (SSB) bandwidth), a low complexity (e.g., reduced processing capability/requirements, less memory, or fewer transmit/receive chains), a lower maximum transmit power level (e.g., 20 dBm or 14 dBm), a reduced number of antennas (e.g., one or two receive antennas), enhanced power savings/long battery life (e.g., in terms of years), reduced or no mobility, communicating a small amount of data, and the like. Nevertheless, such reduced capability UEs (e.g., UEs having a reduced bandwidth or reduced number of antennas) must still coexist with eMBB, URLLC, or LTE-NB IoT/MTC devices. Accordingly, references to a UE type herein generally refer to these reduced capability UEs.

Moreover, some wireless communication systems support CCE aggregation level (AL) for PDCCH frequency diversity. The AL may be 1, 2, 4, or 8, and may use around 6-96 physical resource blocks (PRBs) in one OFDM symbol (e.g., assuming subcarrier spacing (SCS) of 15 kHz). However, a reduced capability UE (e.g., a NR-Light UE, a reduced capability NR UE) may not be able to use a large AL due to its limited bandwidth. For example, in the case of SCS=15 kHz and 24 PRBs per symbol within a bandwidth of 5 mHz, AL=4 may cost (or use) one symbol (e.g., maximum frequency diversity gain within the 5 mHz bandwidth), AL=8 may cost (or use) two symbols, and AL=16 may cost (or use) four symbols. However, such wireless communication systems may not support using four symbols for PDCCH within a slot (e.g., the maximum number of control symbols within the slot is three). Furthermore, the reduced capability UE having one or two receive antennas may require compensation to reach a similar coverage (e.g., as compared to other UEs which may have four or more receive antennas).

Accordingly, aspects of the described techniques provide various mechanisms which enhance communications for such UE types (e.g., reduced capability UEs). For example, the UE may transmit or otherwise provide a UE capability message to the base station (and/or to a network entity via a base station) that carries or otherwise conveys an indication of the UE type for the UE. As discussed, the UE type may be associated with, for example, a reduced capability UE having a reduced bandwidth, a reduced number of antennas, low transmit power levels, little or no mobility, enhanced power saving/extended battery life, or small data transmissions. The UE capability message may be provided during initial connection (e.g., using one or more RRC signals, a MAC control element (CE), and the like), or during registration (e.g., using NAS signaling to a network entity via the base station), or afterwards.

The base station (or network entity) may use the UE type indicated in the UE capability message when selecting or otherwise configuring a control resource set for a control channel for the UE to monitor (e.g., for receiving grants). The set of example slot configurations 200 illustrates four non-limiting examples of slot configurations that may be components of the control resource set selected for the UE in accordance with aspects of the described techniques.

Broadly, the set of example slot configurations 200 expand the control region within a slot (e.g., goes beyond the three symbols typically used for the control resource set). Typically, a slot may have 13 or 14 symbols (e.g., depending on the cyclic prefix used in the slot). Aspects of the described techniques may include the number of symbols within a 14 symbol slot (and/or 13 symbol slot) being configured larger than three symbols for legacy control resource set operations. However, the number of symbols in the control resource set selected by the base station may be configured by RRC signaling, but generally needs to be an integer division of the number of resource element groups (REGs) for the control channel element (CCE). One REG may correspond to 12 resource elements (REs) (or one PRB) in one symbol period, with 6 REGs forming one CCE. The integer division of 6 is 1, 2, 3, and 6 (e.g., for one CCE with AL=1). The integer division of 12 is 1, 2, 3, 4, 6, and 12 (e.g., for one CCE with AL=2). The integer division of 24 is 1, 2, 3, 4, 6, 8, 12, and 24 (e.g., for one CCE with AL=4). The AL generally refers to the number of repetitions of the control information corresponding to the CCE. For example, AL=1 corresponds to one transmission of the control information, AL=2 corresponds to one transmission and one repetition transmission of the control information, and so forth.

Examples of a legacy control resource set design spanning 1-3 symbols to support AL=4 or 8 are described. In one example, 24 RBs (e.g., PRBs and/or REGs) in one symbol may use a total of 24 RBs, which may translate to 6 REGs at AL=4. In another example, 24 RBs (e.g., PRBs and/or REGs) in two symbols may use a total of 48 RBs, which may translate to 6 REGs at AL=8. As another example, 16 RBs (e.g., PRBs and/or REGs) in three symbols may use a total of 48 RBs, which may translate to 6 REGs at AL=8. However, according to aspects of the described techniques, extending the size of the control resource set to cover 4, 6, 8, or 12 symbols may support using higher ALs (e.g., AL=16).

In a first example, the control resource set may correspond to slot configuration 205. Slot configuration 205 illustrates an example of a control resource set 225 (e.g., CORESET 225) that expands the PDCCH region of the slot to four symbols. The control resource set 225 may be configured dynamically (e.g., in the DCI) and/or semi-statically (e.g., using RRC signaling, a MAC CE, and the like). The control resource set 225 configured according to slot configuration 205 may identify the time/frequency domain resources that the UE is to monitor in order to receive control information from the base station (e.g., a grant carried in a DCI). The grant may be for resources for the UE to use to communicate with the base station. The control resource set 225 may be spread across the full BWP supported by the UE (e.g., all of the subbands in the BWP). The base station may transmit the data transmission to the UE in the remaining symbol(s) of the slot according to the grant.

In a second example, the control resource set may correspond to slot configuration 210. Slot configuration 210 illustrates an example of a control resource set 225 (e.g., CORESET 225) that expands the PDCCH region of the slot to six symbols. The control resource set 225 may be configured dynamically (e.g., in the DCI) and/or semi-statically (e.g., using RRC signaling, a MAC CE, and the like). The control resource set 225 configured according to slot configuration 210 may identify the time/frequency domain resources that the UE is to monitor in order to receive control information from the base station (e.g., a grant carried in a DCI). The grant may be for resources for the UE to use to communicate with the base station. The control resource set 225 may use only a subset of the available subbands in the full BWP (e.g., the reduced bandwidth supported by the UE type) The base station may transmit the data transmission to the UE in the remaining symbol(s) of the slot according to the grant.

In a third example, the control resource set may correspond to slot configuration 215. Slot configuration 215 illustrates an example of a control resource set 225 (e.g., CORESET 225) that expands the PDCCH region of the slot to eight symbols. The control resource set 225 may be configured dynamically (e.g., in the DCI) and/or semi-statically (e.g., using RRC signaling, a MAC CE, and the like). The control resource set 225 configured according to slot configuration 215 may identify the time/frequency domain resources that the UE is to monitor in order to receive control information from the base station (e.g., a grant carried in a DCI). The grant may be for downlink resources for the UE to use to communicate with the base station. The control resource set 225 may use only a subset of the available subbands in the full BWP (e.g., the reduced bandwidth supported by the UE type). The base station may transmit the data transmission to the UE in the remaining symbol(s) of the slot according to the grant.

In a fourth example, the control resource set may correspond to slot configuration 220. Slot configuration 220 illustrates an example of a control resource set 225 (e.g., CORESET 225) that expands the PDCCH region of the slot to twelve symbols. The control resource set 225 may be configured dynamically (e.g., in the DCI) and/or semi-statically (e.g., using RRC signaling, a MAC CE, and the like). The control resource set 225 configured according to slot configuration 220 may identify the time/frequency domain resources that the UE is to monitor in order to receive control information from the base station (e.g., a grant carried in a DCI). The grant may be for downlink resources for the UE to use to communicate with the base station. The control resource set 225 may use only a subset of the available subbands in the full BWP (e.g., the reduced bandwidth supported by the UE type). The base station may transmit the data transmission to the UE in the remaining symbol(s) of the slot according to the grant.

Accordingly, the UE and base station may communicate the grant and corresponding data transmission scheduled by the grant in accordance with the control resource set 225. The control resource set 225 may correspond to one or more of slot configurations 205, 210, 215, and/or 220. Control resource set 225 selected by the base station, as illustrated in slot configurations 205, 210, 215, and/or 220, expand the size of the control region with a slot in order to support increased AL and/or to support the reduced capability UE type. As the number of expanded symbols for the control region increase, the number of subbands in the supported BWP used in the control resource set 225 may also decrease.

Accordingly, aspects of the described techniques may provide for identifying how many CCEs will be used using a number of different ALs in the control resource set 225. The AL used to communicate the grant may be based on the UE type and, in some examples, on the identified number of CCEs per different AL. The AL selected for use in the control resource set 225 may be based on the UE type.

Figure 3:
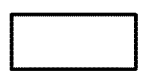
FIG. 3 illustrates a set of example bundling configurations that support PDCCH resources for reduced capability UE in accordance with aspects of the present disclosure.
Figure 3:
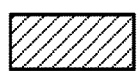
Figure 3:
Figure 3:

FIG. 3 illustrates a set of example bundling configurations 300 that support PDCCH resources for reduced capability UE in accordance with aspects of the present disclosure. In some examples, a set of bundling configurations 300 may implement aspects of wireless communication system 100 and/or the set of example slot configurations 200. Aspects of the set of bundling configurations 300 may be implemented by a UE, base station, and/or a network entity (e.g., MME), which may be examples of corresponding devices described herein. In particular, aspects of the set of bundling configurations 300 may be implemented by a base station when a UE is operating in an RRC connected mode and/or implemented in a network entity when the UE is operating in an RRC inactive or RRC idle mode. In another example, the UE may report the UE capability message to a network entity (e.g., MME through NAS signaling). The base station may perform the features for the UE based on the related information obtained from the network entity. Broadly, the set of example bundling configurations 300 illustrates three examples of CCE-to-REG bundling configurations for PDCCH enhancements that support the UE type having a reduced capability.

As discussed above, some wireless communication systems may utilize various frequency, time, and/or spatial diversity techniques to improve system throughput and performance. While some UE types support such diversity schemes, other UE types may not support all of these techniques. For example, some UE types may be associated with a reduced or limited capability UEs (e.g., reduced bandwidth, fewer antennas, or extended battery life). Accordingly, references to a UE type herein generally refer to these reduced capability UEs.

Aspects of the described techniques provide various mechanisms which enhance communications for such UE types (e.g., reduced capability UEs). For example, the UE may transmit or otherwise provide a UE capability message to the base station (and/or to a network entity via a base station) that carries or otherwise conveys an indication of the UE type for the UE. As discussed, the UE type may be associated with, for example, a reduced capability UE having a reduced bandwidth, a reduced number of antennas, low transmit power levels, little or no mobility, enhanced power saving/extended battery life, or small data transmissions The UE capability message may be provided during initial connection (e.g., using one or more RRC signals, a MAC CE, and the like), or during registration (e.g., using NAS signal to network entity), or afterwards.

The base station (or network entity) may generally select a control resource set for the UE that can be used to transmit control information over a control channel to the UE according to the UE type. In some aspects, this may include the control resource set utilizing a number of symbols in the slot for the control channel based on the number of CCEs, where three or more symbols may be used in the slot.

Wireless communication systems may utilize CCE-to-REG bundling (or mapping) configurations. In terms of time/frequency resources, one REG corresponds to 12 REs in one symbol and six REG form one CCE. The AL selected for use in the control resource set determines the number of repetitions of the control information (e.g., grant), which also corresponds to the multiple of CCEs in the control resource set. For example, the total number of REGs (and by extension the number of CCEs) may correspond to the NumREG=6*AL (e.g., 6, 12, 24, 48, or 96 REGs) using ALs (1, 2, 4, 8, or 16). However, some wireless communication systems may not support configurations resulting in the NumREG/NumSymbol resulting in a non-integer. For example, a NumSymbol=4 (e.g., there are four symbols for the control channel in the control resource set) is not configured for NumREG=6, and NumSymbol=8 is not configured for NumREG=6 or 12. In some aspects, the selected control resource set may include using non-interleaving where the REG numbering is provided in a time first manner and a function of NumREG (e.g., f(x)=x, with x=0, . . . , (NumREG−1)). Using REG bundling having a size of (L), the UE may use the same precoder used for REGs in a REG bundle. However, aspects of the described techniques introduce or add, in addition to the L=6 legacy control resource set, L={NumSymbol or least common multiplier (LCM)(6, NumSymbol)} if the NumSymbol>3, e.g., as configured by RRC.

The set of example bundling configurations 300 illustrates three non-limiting examples of bundling configurations that may be components of a resource allocation scheme selected for the UE in accordance with aspects of the described techniques. Broadly, each block illustrated in the set of example bundling configurations may correspond to one RE.

In a first example, the control resource set may correspond to bundling configuration 305. Broadly, bundling configuration 305 illustrates an example where the control resource set selected for the UE to use to monitor the control channel over 4, 6, or 12 symbols (e.g., NumSymbol=4, 6, or 12). Bundling configuration 305 illustrates an example where L=4 or 12, NumSymbol=4, and no interleaving is used.

Bundling configuration 305 illustrates an example CCE-to-REG bundling configuration where the first four REs of REG bundle 320 are mapped to the first four symbols on the first subcarrier (e.g., subband) in the slot, with the last two REs wrapping around to the first two symbols on the second subcarrier in the slot. The first two REs of REG bundle 325 are mapped to the last two symbols on the second subcarrier in the slot, with the last four REs wrapping around to all four symbols on the third subcarrier.

Bundling configuration 305 illustrates another example where L=6, NumSymbol=6, and no interleaving is used. In this example CCE-to-REG bundling configuration, all six REs of REG bundle 320 are mapped to the first six symbols on the first subcarrier (e.g., subband) in the slot and all six REs of REG bundle 325 are mapped to the first six symbols on the second subcarrier in the slot.

However, in some scenarios, interleaving may be configured in the control resource set. Aspects of the described techniques may continue to use REG numbering in a time first manner with the unit of REG bundling in the frequency domain and $f(x)=(rC+c+n\_shift) \mod(NumREG/L)$, with $x=R+r, r=0, \ldots R-1, c=0, \ldots C-1$ and $C=NumREG/(L*R)$. The value of R may be 2, 3, or 6, e.g., to support legacy operations. As discussed above, control resource sets typically do not support configurations resulting in the quantity of C not being an integer value. In REG bundling with the size of (L), UEs may assume use of the same precoder used for the REGs in a REG bundle. However, as discussed above aspects of the described techniques may, in addition to the L values for legacy control resource sets, add L={NumSymbol or LCM(6,NumSymbol)} if NumSymbol>3, e.g., as configured by RRC. Alternatively, L may be implicitly set to be equal to NumSymbol to reduce signaling overhead.

Accordingly and in a second example, the control resource set may correspond to bundling configuration 310. Broadly, bundling configuration 310 illustrates an example where the control resource set selected for the UE to use to monitor the control channel over four symbols (e.g., NumSymbol=4). Bundling configuration 310 illustrates an example where L=4 NumSymbol=4, and interleaving is used. Initially (e.g., prior to interleaving), bundling configuration 310 illustrates an example CCE-to-REG bundling configuration where the first four REs of REG bundle 320 are mapped to the first four symbols on the first subcarrier (e.g., subband) in the slot, with the last two REs wrapping around to the first two symbols on the second subcarrier in the slot. The first two REs of REG bundle 325 are mapped to the last two symbols on the second subcarrier in the slot, with the last four REs wrapping around to all four symbols on the third subcarrier. The first four REs of REG bundle 330 are mapped to the first four symbols on the fourth subcarrier in the slot, with the last two REs wrapping around to the first two symbols on the fifth subcarrier in the slot. The first two REs of REG bundle 335 are mapped to the last two symbols on the fifth subcarrier in the slot, with the last four REs wrapping around to all four symbols on the sixth subcarrier.

After interleaving, bundling configuration 310 illustrates an example CCE-to-REG bundling configuration where the first four REs of REG bundle 320 are mapped to the first four symbols on the first subcarrier in the slot, with the last two REs wrapping around to the first two symbols on the fourth subcarrier in the slot. The last four REs of REG bundle 325 are mapped to the first four symbols on the second subcarrier in the slot, with the first two REs wrapping around to the last two symbols on the fourth subcarrier in the slot. The last two REs of REG bundle 330 are mapped to the first two symbols on the third subcarrier in the slot, with the first four REs being mapped to the first four symbols on the fifth subcarrier in the slot. And finally, the first two REs of REG bundle 335 are mapped to the last two symbols on the third subcarrier in the slot, with the last four REs being mapped to the first four symbols on the sixth subcarrier in the slot.

In a third example, the control resource set may correspond to bundling configuration 315. Broadly, bundling configuration 315 illustrates an example where the control resource set selected for the UE to use to monitor the control channel over six symbols (e.g., NumSymbol=6). Bundling configuration 315 illustrates an example where L=6, R=2, and NumSymbol=6, and interleaving is used. Initially (e.g., prior to interleaving), bundling configuration 315 illustrates an example CCE-to-REG bundling configuration where all six REs of REG bundle 320 are mapped to the six symbols on the first subcarrier in the slot, all six REs of REG bundle 325 are mapped to the six symbols on the second subcarrier in the slot, all six REs of REG bundle 330 are mapped to the six symbols on the third subcarrier in the slot, and all six REs of REG bundle 335 are mapped to the six symbols on the fourth subcarrier in the slot.

After interleaving, bundling configuration 315 illustrates an example CCE-to-REG bundling configuration where all six REs of REG bundle 320 are mapped to the six symbols on the first subcarrier in the slot, all six REs of REG bundle 325 are mapped to the six symbols on the third subcarrier in the slot, all six REs of REG bundle 330 are mapped to the six symbols on the second subcarrier in the slot, and all six REs of REG bundle 335 are mapped to the six symbols on the fourth subcarrier in the slot.

Accordingly, one or more of the example bundling configurations described herein may be utilized in the control resource set selected for the UE based, at least in part, on the UE type indicating that the UE is a reduced capability UE.

Figure 4:
FIG. 4 illustrates a set of example slot configurations that support PDCCH resources for reduced capability UE in accordance with aspects of the present disclosure.
Figure 4:
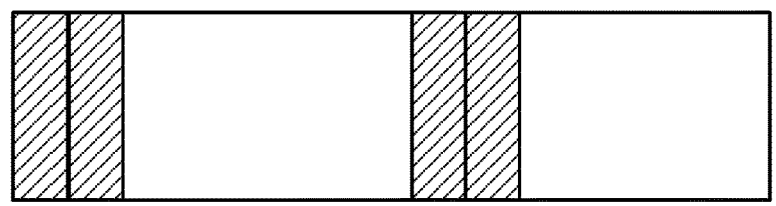
Figure 4:
Figure 4:

FIG. 4 illustrates a set of example slot configurations 400 that support PDCCH resources for reduced capability UE in accordance with aspects of the present disclosure. In some examples, the set of example slot configurations 400 may implement aspects of wireless communication system 100, the set of example slot configurations 200, and/or the set of bundling configuration 300. Aspects of the set of example slot configurations 400 may be implemented by a UE, base station, and/or a network entity (e.g., MME), which may be examples of corresponding devices described herein. In particular, aspects of the set of example slot configurations 400 may be implemented by a base station when the UE is operating in an RRC connected mode and/or implemented in a network entity (e.g., MME) when the UE is operating in an RRC inactive or RRC idle mode. In another example, the UE may report the capability to network entity (e.g., to an MME through NAS signaling). The base station may perform the techniques described herein for the UE based on the related information obtained by the network entity. Broadly, the set of example slot configurations 400 illustrates two examples of slot configurations for PDCCH enhancements that support a UE type having (or associated with) a reduced capability.

As discussed above, some wireless communication systems may utilize various frequency, time, and/or spatial diversity techniques to improve system throughput and performance. While some UE types support such diversity schemes, other UE types may not support such techniques. For example, some UE types may be associated with a reduced or limited capability UEs (e.g., reduced bandwidth, fewer antennas, or extended battery life). Accordingly, references to a UE type herein generally refer to these reduced capability UEs.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduce number of antennas, low transmit power levels, little or no mobility, or enhanced power saving/extended battery life. The UE capability message may be provided during initial connection (e.g., using one or more RRC signals, a MAC CE, and the like), or during registration (e.g., using NAS signal to network entity), or afterwards. The base station (or network entity) may use the UE type indicated in the UE capability message when selecting or otherwise configuring a control resource set for a control channel for the UE to monitor (e.g., for receiving grants).

Broadly, the set of example slot configurations 400 add one or more additional control regions within a slot for intra-slot repetition of the control information (e.g., PDCCH carrying the grant) transmitted over the control channel. In some aspects, the UE capability message may be configured to carry or otherwise convey an indication that the UE supports intra-slot repetition of the control information using two or more control regions within the slot. Intra-slot demodulation reference signals (DMRSs) for the PDCCHs (e.g., for the two or more control regions) may be utilized or otherwise associated for channel estimation. In some examples, the control resource set may be repeated or duplicated (e.g., using the same parameters) for each control region within the slot, e.g., control resource set ID, frequency band, duration, or quasi co-location (QCL), may be duplicated or the same within each control region. Moreover, the contents of the control channel (e.g., the DCI conveying the grant) may also be duplicated or repeated within each control region within the slot. In some aspects, the repetition pattern of the control resource set can be configured to include the number of repetitions, whether the repetitions are consecutive or nonconsecutive (e.g., contiguous or noncontiguous), and the like. The total number of symbols for the control resource set including the intra-slot control resource set repetition may be no larger than the slot. When nonconsecutive repetition patterns are used, an additional configuration information relating to the starting symbol may also be configured. Otherwise, the control resource set may be limited to consecutive or nonconsecutive repetitions with a predefined starting symbol or offset, e.g., the repeated control resource set may start from the half slot (e.g., mid-slot) to avoid additional signaling in some examples.

Accordingly and in a first example, the control resource set may correspond to slot configuration 405. Slot configuration 405 illustrates an example of a control resource set that is repeated within a slot. Slot configuration 405 may use the first two symbols of the slot to carry control information (e.g., PDCCH 415, which may include the DCI carrying the grant for the UE) and then repeat the control information in the next two symbols of the slot (e.g., PDCCH repetition 420, which may include a repetition of the DCI carrying the grant for the UE). That is, slot configuration 405 illustrates an example where a first control region spans the first two symbols of the slot and a second control region is consecutive (or contiguous) within the slot and spans the next two symbols (e.g., the third and fourth symbols) of the slot.

In a second example, the control resource set may correspond to slot configuration 410. Slot configuration 410 illustrates an example of a control resource set that is repeated within a slot. Slot configuration 410 may use the first two symbols of the slot to carry control information (e.g., PDCCH 415, which may include the DCI carrying the grant for the UE) and then repeat the control information mid-slot using another two symbols of the slot (e.g., PDCCH 415, which may carry the DCI carrying the grant for the UE). That is, slot configuration 410 illustrates an example where a first control region spans the first two symbols of the slot and a second control region is non-consecutive (or non-contiguous) within the slot and spans two symbols in the middle (e.g., the sixth and seventh symbols, the seventh and eight symbols, or similar patterns) of the slot. Of course the second control region of the slot is not limited to mid-slot, but can span any two symbols of the slot that are non-consecutive with the first control region.

Accordingly, the UE and base station may communicate the grant and corresponding data transmission scheduled by the grant in accordance with the control resource set. The control resource set may correspond to one or more of slot configurations 405 and/or 410. The control resource set selected by the base station, as illustrated in slot configurations 405 and/or 410, may expand the size of the control region within a slot in order to support increased AL and/or to support the reduced capability UE type.

Figure 5:
FIG. 5 illustrates a set of example slot configurations that support PDCCH resources for reduced capability UE in accordance with aspects of the present disclosure.
Figure 5:
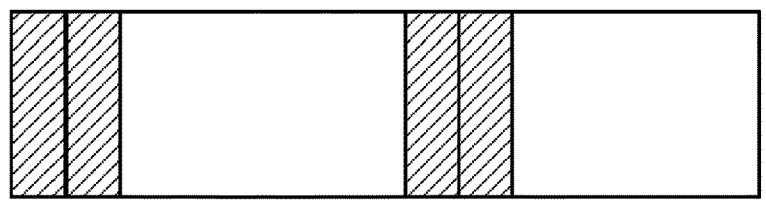
Figure 5:
Figure 5:

FIG. 5 illustrates a set of example slot configurations 500 that support PDCCH resources for reduced capability UE in accordance with aspects of the present disclosure. In some examples, set of example slot configurations 500 may implement aspects of wireless communication system 100, the set of example slot configurations 200 and/or 400, and/or the set of bundling configurations 300. Aspects of the set of example slot configurations 500 may be implemented by a UE, a base station, and/or a network entity (e.g., MME), which may be examples of corresponding devices described herein. In particular, aspects of the set of example slot configurations 500 may be implemented by a base station when the UE is operating in an RRC connected mode and/or implemented in a network entity (e.g., MME) when the UE is operating in an RRC inactive or RRC idle mode. The base station may perform the techniques described herein for the UE based on the related information obtained by the network entity. Broadly, the set of example slot configurations 500 illustrates two examples of slot configurations for PDCCH enhancements that support a UE type having (or associated with) a reduced capability.

As discussed above, some wireless communication systems may utilize various frequency, time, and/or spatial diversity techniques to improve system throughput and performance. While some UE types support such diversity schemes, other UE types may not support such techniques. For example, some UE types may be associated with a reduced or limited capability UEs (e.g., reduced bandwidth, fewer antennas, or extended battery life). Accordingly, references to a UE type herein generally refer to these reduced capability UEs.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduce number of antennas, low transmit power levels, little or no mobility, or enhanced power saving/extended battery life. The UE capability message may be provided during initial connection (e.g., using one or more RRC signals, a MAC CE, and the like), or during registration (e.g., using NAS signal to network entity), or afterwards. The base station (or network entity) may use the UE type indicated in the UE capability message when selecting or otherwise configuring a control resource set for a control channel for the UE to monitor (e.g., for receiving grants).

Broadly, the examples illustrated in the set of example slot configurations 500 support inter-slot control information. For example, the inter-slot control information may be based on inter-slot repetition for PDCCH (e.g., initial PDCCH transmission and/or one or more repetitions of the PDCCH transmissions). Inter-slot DMRS may be supported for PDCCHs with the same frequency resource allocation between slots. Alternatively, the inter-slot control information may support the AL being configured to be across slots instead of the PDCCH repetition. That is, the contents of the control channel (e.g., the DCI conveying the grant) may also be spread across each slot.

Accordingly and in a first example, the control resource set may correspond to slot configuration 505. Slot configuration 505 illustrates an example of a control resource set that is repeated across two slots. Slot configuration 505 may use the first two symbols of the first slot to carry control information (e.g., PDCCH 515, which may include the DCI carrying the grant for the UE) and then repeat the control information in the first two symbols of the second slot (e.g., PDCCH repetition 520, which may include a repetition of the DCI carrying the grant for the UE). That is, slot configuration 505 illustrates an example where a first control region spans the first two symbols of the first slot and a second control region spans the first two symbols of the second slot, with the second control region being used to provide PDCCH repetition 520.

In a second example, the control resource set may correspond to slot configuration 510. Slot configuration 510 illustrates an example of a control resource set that spans across two slots. Slot configuration 510 may use the first two symbols of the first slot to carry a first portion of the control information (e.g., PDCCH 515, which may include the DCI carrying the grant for the UE) and then use the first two symbols of the second slot to carry the second portion of the control information (e.g., PDCCH 515, which may include the remaining portions of the DCI carrying the grant for the UE). That is, slot configuration 510 illustrates an example where a first control region spans the first two symbols of the first slot and a second control region spans the first two symbols of the second slot, with the first control region being used to provide a first portion of PDCCH 515 and the second control region being used to provide the second portion of PDCCH 515.

Accordingly, the UE and base station may communicate the grant and corresponding data transmission scheduled by the grant in accordance with the control resource set. The control resource set may correspond to one or more of slot configurations 505 and/or 510.

Figure 6:
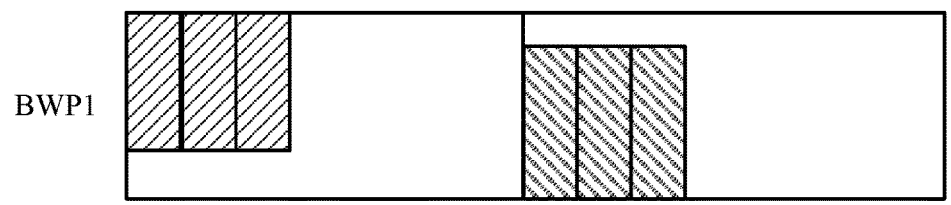
FIG. 6 illustrates a set of example slot configurations that support PDCCH resources for reduced capability UE in accordance with aspects of the present disclosure.
Figure 6:
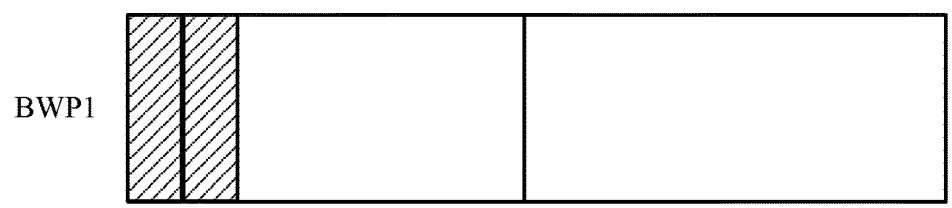
Figure 6:
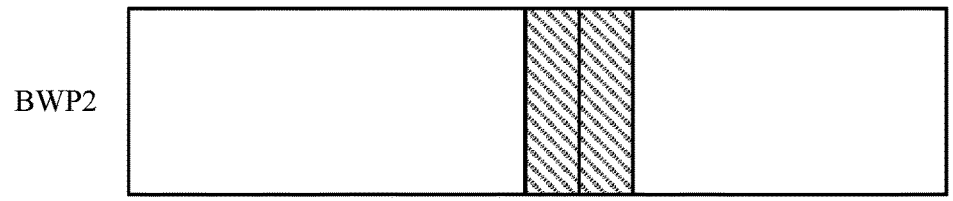
Figure 6:
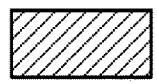
Figure 6:

FIG. 6 illustrates a set of example slot configurations 600 that support PDCCH resources for reduced capability UE in accordance with aspects of the present disclosure. In some examples, set of example slot configurations 600 may implement aspects of wireless communication system 100, the set of example slot configurations 200, 400 and/or 500, and/or the set of bundling configurations 300. Aspects of the set of example slot configurations 600 may be implemented by a UE, base station, and/or a network entity (e.g., MME), which may be examples of corresponding devices described herein. In particular, aspects of the set of example slot configurations 600 may be implemented by a base station when the UE is operating in an RRC connected mode and/or implemented in a network entity (e.g., MME) when the UE is operating in an RRC inactive or RRC idle mode. The base station may perform the techniques described herein for the UE based on the related information obtained by the network entity. Broadly, the set of example slot configurations 600 illustrates two examples of slot configurations for PDCCH enhancements that support a UE type having (or associated with) a reduced capability.

As discussed above, some wireless communication systems may utilize various frequency, time, and/or spatial diversity techniques to improve system throughput and performance. While some UE types support such diversity schemes, other UE types may not support such techniques. For example, some UE types may be associated with a reduced or limited capability UEs (e.g., reduced bandwidth, fewer antennas, or extended battery life). Accordingly, references to a UE type herein generally refer to these reduced capability UEs.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduce number of antennas, low transmit power levels, little or no mobility, or enhanced power saving/extended battery life. The UE capability message may be provided during initial connection (e.g., using one or more RRC signals, a MAC CE, and the like), or during registration (e.g., using NAS signal to network entity), or afterwards. The base station (or network entity) may use the UE type indicated in the UE capability message when selecting or otherwise configuring a control resource set for a control channel for the UE to monitor (e.g., for receiving grants).

Broadly, the examples illustrated in the set of example slot configurations 600 support inter-slot repetition for PDCCH with frequency hopping within a supported bandwidth part (BWP) and/or between different supported BWPs. Inter-/intra-slot DMRS for the PDCCHs may be used with the same frequency resource allocation and associated within a frequency hop. When PDCCH frequency hopping is configured, PDSCH frequency hopping may follow the PDCCH frequency hopping pattern, e.g., to keep PDSCH in the same BWP as the PDCCH. The UE may assume that the PDCCH and PDSCH have the same QCL configuration for simplified detection and with no additional processing time.

Accordingly and in a first example, the control resource set may correspond to slot configuration 605. Slot configuration 605 illustrates an example of a control resource set that is repeated across two slots within the same BWP (e.g., BWP1) and uses frequency hopping. Slot configuration 605 may use the first two symbols of the first slot to carry control information (e.g., PDCCH 615, which may include the DCI carrying the grant for the UE) using a first set of the subbands in the BWP (e.g., BWP1). Slot configuration 605 may then repeat the control information in the first two symbols of the second slot (e.g., PDCCH repetition 620, which may include a repetition of the DCI carrying the grant for the UE) using a second set of subbands in the BWP (e.g., BWP1). The first set of subbands and the second set of subbands may be different in general, although there may be some degree of overlap of subbands between the sets of subbands.

In a second example, the control resource set may correspond to slot configuration 610. Slot configuration 610 illustrates an example of a control resource set that is repeated across two slots within the different BWPs (e.g., BWP1 and BWP2) and uses frequency hopping. Slot configuration 610 may use the first two symbols of the first slot to carry control information (e.g., PDCCH 615, which may include the DCI carrying the grant for the UE) using a first set of the subbands in the first BWP (e.g., BWP1). Slot configuration 610 may then repeat the control information in the first two symbols of the second slot (e.g., PDCCH repetition 620, which may include a repetition of the DCI carrying the grant for the UE) using a second set of subbands in the second BWP (e.g., BWP2). The first set of subbands and the second set of subbands may be different between the two BWPs.

Accordingly, the UE and base station may communicate the grant and corresponding data transmission scheduled by the grant in accordance with the control resource set. The control resource set may correspond to one or more of slot configurations 605 and/or 610.

Figure 7:
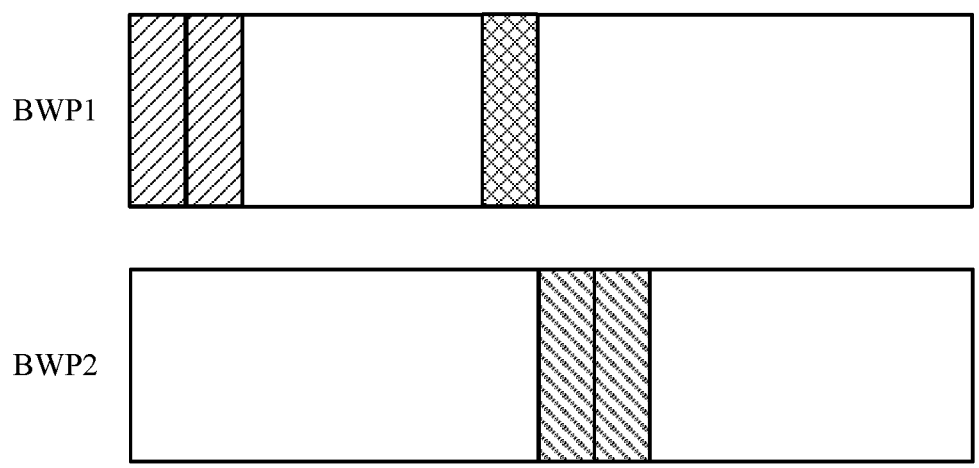
FIG. 7 illustrates an example slot configuration that supports PDCCH resources for reduced capability UE in accordance with aspects of the present disclosure.
Figure 7:
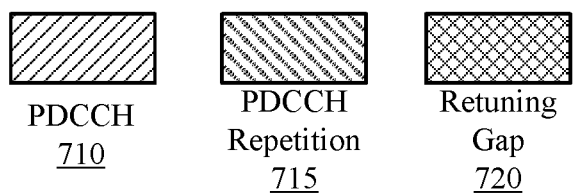

FIG. 7 illustrates an example slot configuration 705 that support PDCCH resources for reduced capability UE in accordance with aspects of the present disclosure. In some examples, the example slot configuration 705 may implement aspects of wireless communication system 100, the set of example slot configurations 200, 400 500, and/or 600, and/or the set of bundling configurations 300. Aspects of the example slot configuration 705 may be implemented by a UE, base station, and/or a network entity (e.g., MME), which may be examples of corresponding devices described herein. In particular, aspects of the set of example slot configurations 700 may be implemented by a base station when the UE is operating in an RRC connected mode and/or implemented in a network entity (e.g., MME) when the UE is operating in an RRC inactive or RRC idle mode. The base station may perform the techniques described herein for the UE based on the related information obtained by the network entity. Broadly, the example slot configuration 705 can be used for PDCCH enhancements that support a UE type having (or associated with) a reduced capability.

As discussed above, some wireless communication systems may utilize various frequency, time, and/or spatial diversity techniques to improve system throughput and performance. While some UE types support such diversity schemes, other UE types may not support such techniques. For example, some UE types may be associated with a reduced or limited capability UEs (e.g., reduced bandwidth, fewer antennas, or extended battery life). Accordingly, references to a UE type herein generally refer to these reduced capability UEs.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduce number of antennas, low transmit power levels, little or no mobility, or enhanced power saving/extended battery life. The UE capability message may be provided during initial connection (e.g., using one or more RRC signals, a MAC CE, and the like), or during registration (e.g., using NAS signal to network entity), or afterwards. The base station (or network entity) may use the UE type indicated in the UE capability message when selecting or otherwise configuring a control resource set for a control channel for the UE to monitor (e.g., for receiving grants).

Broadly, the example slot configuration 705 supports inter-slot repetition for PDCCH with frequency hopping between different supported BWPs using a retuning gap. Downlink radio frequency (RF) retuning due to frequency hopping may be configured, e.g., if needed for inter-BWP frequency hopping, a dual connectivity (DC) change, and the like. The guard period for RF retuning may not be in the PDCCH symbols at the beginning of the slot after frequency hopping. The guard period for the RF retuning may be in the symbol(s) at the end of the slot before frequency hopping, e.g., symbols reserved for uplink control information, such as physical uplink control channel (PUCCH) information. The UE may not be expected to monitor/send signals in the retuning gap during the frequency hopping. That is, the UE may not transmit the PUCCH if in its retuning region.

The frequency hopping pattern for PDCCH may be configured by RRC and/or DCI. With respect to the frequency domain location of the frequency hopping, for intra-BWP frequency hopping, an RB offset indication may be provided. A NR-Light UE (e.g., a reduced capability UE) may share the same BWP with non-bandwidth limited UEs, with a size larger than its maximum supported bandwidth. In some aspects, only an active subband may be configured for the NR-Light UE (e.g., the reduced capability UE type) with a size no larger than the maximum supported bandwidth. An RB offset within the large downlink BWP may be configured for NR-Light UEs with frequency hopping. The UE may drop the RB if frequency hopping leads to a wraparound (e.g., the starting RB and ending RB are into edges of the wide BWP larger than the maximum supported bandwidth).

For inter-BWP frequency hopping, a BWP offset indication (or BWP index sequence) may be provided. A NR-Light UE may be configured with more than one downlink BWP with a size no larger than the maximum supported bandwidth of the UE. This may keep the same relative RB location within the downlink BWP after frequency hopping. Alternatively, a floating narrowband BWP with a predefined frequency hopping pattern may be configured. A NR-Light UE may be configured with a downlink BWP with a size no larger than the maximum supported bandwidth of the UE. The center frequency for the downlink BWP may be changed based on the frequency hopping pattern.

Accordingly, the control resource set may correspond to slot configuration 705. Slot configuration 705 illustrates an example of a control resource set that is repeated across two slots within different BWPs (e.g., BWP1 and BWP2) and using frequency hopping, wherein a retuning gap is configured between slots. Slot configuration 705 may use the first two symbols of the first slot to carry control information (e.g., PDCCH 710, which may include the DCI carrying the grant for the UE) in the first BWP (e.g., BWP1). Slot configuration 705 may schedule or otherwise configure a retuning gap 720 during the last symbol of the first slot. The retuning gap 720 may provide a time period in which the UE may return from the first BWP (e.g., BWP1) to the second BWP (e.g., BWP2). Slot configuration 705 may then repeat the control information in the first two symbols of the second slot (e.g., PDCCH repetition 715, which may include a repetition of the DCI carrying the grant for the UE) in the second BWP (e.g., BWP2).

Accordingly, the UE and base station may communicate the grant and corresponding data transmission scheduled by the grant in accordance with the control resource set. The control resource set may correspond to slot configuration 705.

Figure 8:
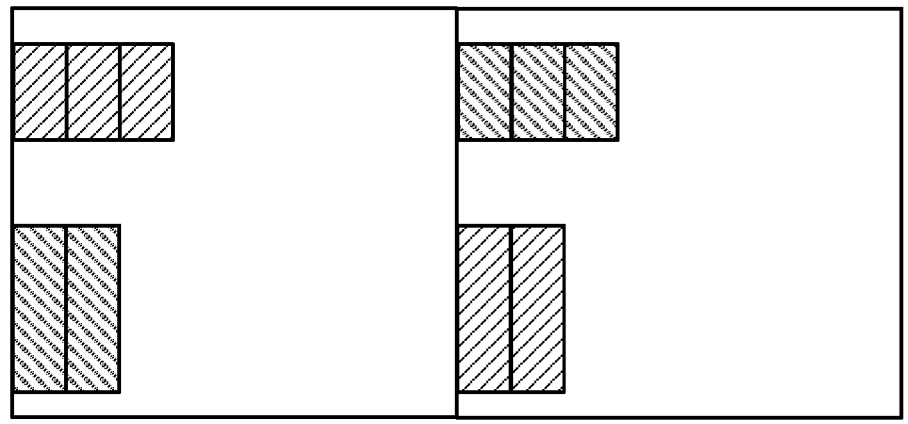
FIG. 8 illustrates an example slot configuration that supports PDCCH resources for reduced capability UE in accordance with aspects of the present disclosure.
Figure 8:
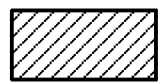
Figure 8:

FIG. 8 illustrates an example slot configuration 805 that supports PDCCH resources for reduced capability UE in accordance with aspects of the present disclosure. In some examples, the example slot configurations 805 may implement aspects of wireless communication system 100, the set of example slot configurations 200, 400 500, 600, and/or example slot configuration 705, and/or the set of bundling configurations 300. Aspects of example slot configuration 805 may be implemented by a UE, base station, and/or a network entity (e.g., MME), which may be examples of corresponding devices described herein. In particular, aspects of the example slot configuration 805 may be implemented by a base station when the UE is operating in an RRC connected mode and/or implemented in a network entity (e.g., MME) when the UE is operating in an RRC inactive or RRC idle mode. The base station may perform the techniques described herein for the UE based on the related information obtained by the network entity. Broadly, the example slot configuration 805 provides PDCCH enhancements that support a UE type having (or associated with) a reduced capability.

As discussed above, some wireless communication systems may utilize various frequency, time, and/or spatial diversity techniques to improve system throughput and performance. While some UE types support such diversity schemes, other UE types may not support such techniques. For example, some UE types may be associated with a reduced or limited capability UEs (e.g., reduced bandwidth, fewer antennas, or extended battery life.). Accordingly, references to a UE type herein generally refer to these reduced capability UEs.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduce number of antennas, low transmit power levels, little or no mobility, or enhanced power saving/extended battery life. The UE capability message may be provided during initial connection (e.g., using one or more RRC signals, a MAC CE, and the like), or during registration (e.g., using NAS signal to network entity), or afterwards. The base station (or network entity) may use the UE type indicated in the UE capability message when selecting or otherwise configuring a control resource set for a control channel for the UE to monitor (e.g., for receiving grants).

Broadly, the example slot configurations 805 supports the combining of different control resource sets. A UE may be configured with 4 BWPs in a serving cell and 1-3 control resource sets per BWP. In total, up to 12 control resource sets may be configured in one serving cell. The control resource set identifier (ID) (e.g., controlResourcesSetid) may be unique among the BWPs of a serving cell. A base station (e.g., gNB) may provide an indication of a set of control resource sets having the same PDCCH for UE combining. Each control resource set may have different IDs, frequency bands, durations, and search space configurations. The QCL may be configured the same or different between the control resource sets. A QCL configured the same may be simpler for a UE as it does not change QCL for the combining. A QCL configured differently may achieve larger spatial diversity.

Accordingly, the control resource set may correspond to slot configuration 805. Slot configuration 805 illustrates an example of a control resource set that supports combining of the control resources sets. Slot configuration 805 may use the first three symbols of the first slot to carry control information (e.g., PDCCH, which may include a first portion of (or repetition of) the DCI carrying the grant for the UE) for a first control resource set (e.g., CORESET #1 810) in a first set of subbands of the slot. Slot configuration 805 may use the first two symbols of the first slot to carry control information (e.g., PDCCH, which may include a first portion of (or repetition of) the DCI carrying the grant for the UE) for a second control resource set (e.g., CORESET #2 815) in a second set of subbands of the slot. The first and second set of subbands may not overlap.

Frequency hopping may be used between the first slot and the second slot. Accordingly, slot configuration 805 may use the first three symbols of the second slot to carry control information (e.g., PDCCH, which may include a first portion of (or repetition of) the DCI carrying the grant for the UE) for the second control resource set (e.g., CORESET #2 815) in the first set of subbands of the slot. Slot configuration 805 may use the first two symbols of the second slot to carry control information (e.g., PDCCH, which may include a first portion of (or repetition of) the DCI carrying the grant for the UE) for the first control resource set (e.g., CORESET #1 810) in the second set of subbands of the slot. A search space monitoring offset may be configured corresponding to the second symbol in the second slot and using the first set of subbands of the supported bandwidth of the UE.

Accordingly, the UE and base station may communicate the grant and corresponding data transmission scheduled by the grant in accordance with the control resource set. The control resource set may correspond to slot configuration 805.

Figure 9:
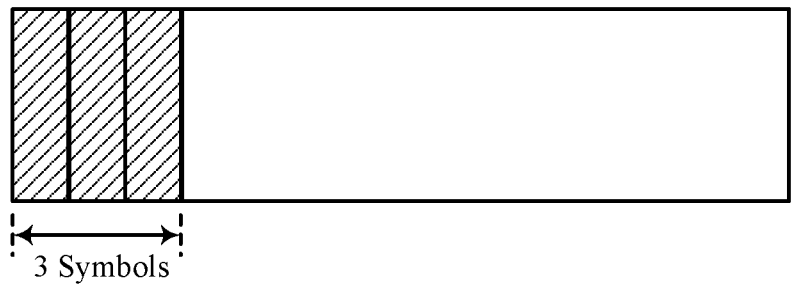
FIG. 9 illustrates an example slot configuration that supports PDCCH resources for reduced capability UE in accordance with aspects of the present disclosure.
Figure 9:

FIG. 9 illustrates an example slot configuration 905 that support PDCCH resources for reduced capability UE in accordance with aspects of the present disclosure. In some examples, the example slot configuration 905 may implement aspects of wireless communication system 100, the set of example slot configurations 200, 400 500, 600, example slot configurations 705, 805, and/or the set of bundling configurations 300. Aspects of the example slot configuration 905 may be implemented by a UE, base station, and/or a network entity (e.g., MME), which may be examples of corresponding devices described herein. In particular, aspects of the example slot configurations 905 may be implemented by a base station when the UE is operating in an RRC connected mode and/or implemented in a network entity (e.g., MME) when the UE is operating in an RRC inactive or RRC idle mode. The base station may perform the techniques described herein for the UE based on the related information obtained by the network entity. Broadly, example slot configuration 905 provides PDCCH enhancements that support a UE type having (or associated with) a reduced capability.

As discussed above, some wireless communication systems may utilize various frequency, time, and/or spatial diversity techniques to improve system throughput and performance. While some UE types support such diversity schemes, other UE types may not support such techniques. For example, some UE types may be associated with a reduced or limited capability UEs (e.g., reduced bandwidth, fewer antennas, or extended battery life). Accordingly, references to a UE type herein generally refer to these reduced capability UEs.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduce number of antennas, low transmit power levels, little or no mobility, or enhanced power saving/extended battery life. The UE capability message may be provided during initial connection (e.g., using one or more RRC signals, a MAC CE, and the like), or during registration (e.g., using NAS signal to network entity), or afterwards. The base station (or network entity) may use the UE type indicated in the UE capability message when selecting or otherwise configuring a control resource set for a control channel for the UE to monitor (e.g., for receiving grants).

Broadly, the example slot configuration 905 supports an AL=12 or AL=24 for PDCCH. This may include reusing legacy PDCCH span regions with no more than three symbols in the slot being used for the control resource set. However, more candidates of AL increase the number of blind detections. In order to avoid increasing the number of blind detections by the UE, the AL=1, 2, 4, 8, 12 can be configured for NR-Light UEs (e.g., reduced capability UEs) instead of the AL=1, 2, 4, 8, 16 for legacy UEs. It is also possible to configure the AL based on the UE supported bandwidth and the configured numerology in the supported bandwidth. For a UE with a supported bandwidth of 5 MHz and subcarrier spacing of 15 kHz or a UE with supported bandwidth of 10 MHz and subcarrier spacing of 30 kHz (e.g., 24 resource blocks within the supported bandwidth), AL=1, 2, 4, 8, 12 can be configured; while for a UE with supported bandwidth of 10 MHz and subcarrier spacing of 15 kHz (e.g., 48 resource blocks within the supported bandwidth), AL=1, 2, 4, 8, 12, 24 can be configured. For a cell-edge NR-Light UE with a supported bandwidth of 10 MHz and subcarrier spacing of 15 kHz, a set of ALs can be configured, such as AL=2, 4, 8, 12, 24 to make full use of the aggregation diversity while using the same number of blind detections as a legacy UE.

Accordingly, the control resource set may correspond to slot configuration 905. Slot configuration 905 illustrates an example of a control resource set that supports AL=12. Slot configuration 905 may use the first three symbols of the slot to carry control information (e.g., PDCCH 910, which may include a first portion of (or repetition of) the DCI carrying the grant for the UE) for the control resource set. The extended AL (e.g., AL=12) may include 24 RBs×3 symbols=721 RBs (e.g., AL12*6 REGs).

Accordingly, the UE and base station may communicate the grant and corresponding data transmission scheduled by the grant in accordance with the control resource set. The control resource set may correspond to slot configuration 905.

Figure 10:
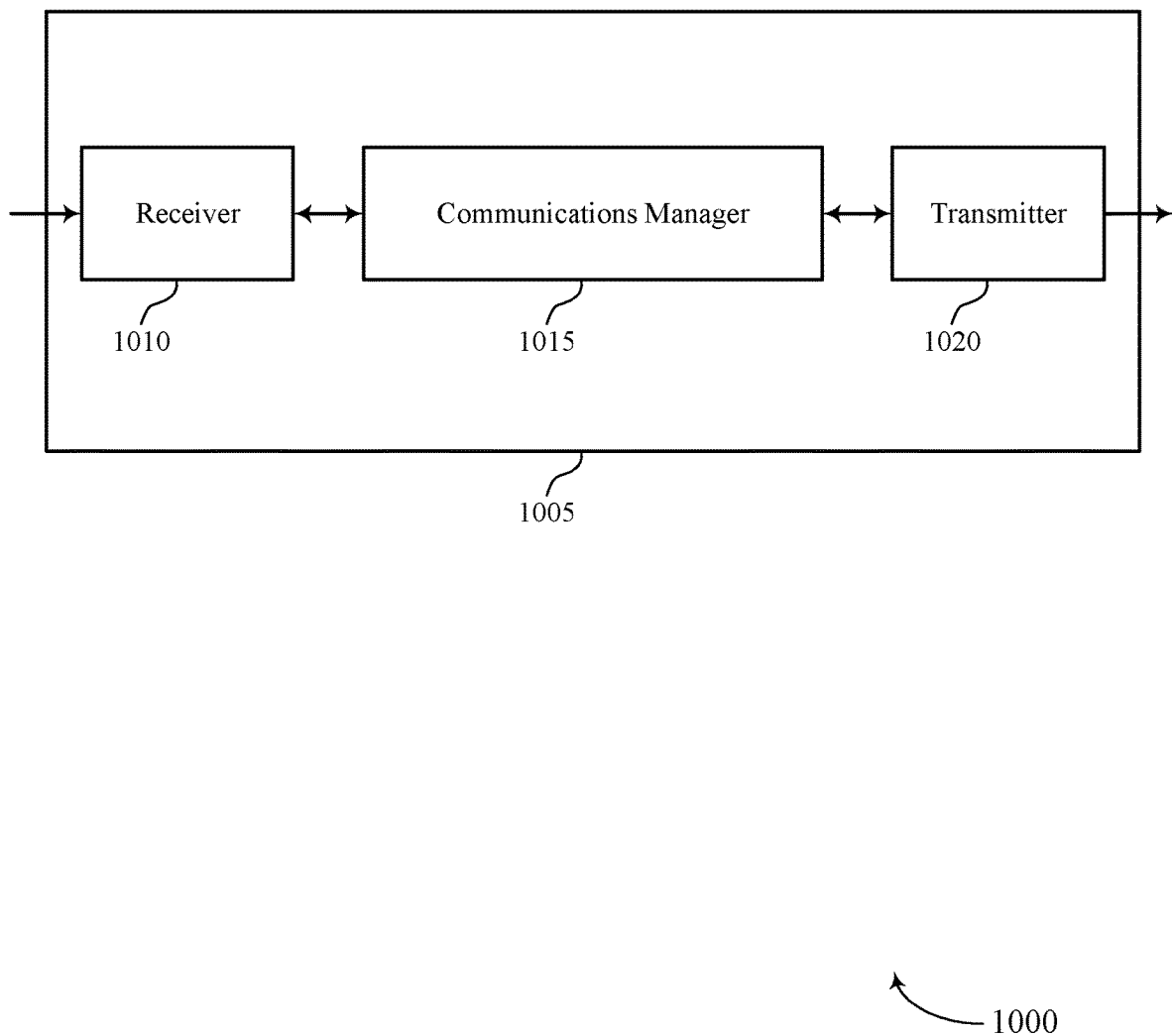
FIGS. 10 and 11 show block diagrams of devices that support PDCCH resources for reduced capability UE in accordance with aspects of the present disclosure.

FIG. 10 shows a block diagram 1000 of a device 1005 that supports PDCCH resources for reduced capability UE in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to PDCCH resources for reduced capability UE). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a UE capability message to a base station, the UE capability message including an indication of a UE type, the UE type associated with at least one of a reduced bandwidth, or a reduced number of antennas, or a combination thereof, for the UE, monitor, based on a control resource set that is based on the UE type, a control channel for a downlink grant for downlink resources, receive, based on the monitoring, a grant identifying the downlink resources for communicating with the base station, and communicate with the base station using the identified downlink resources. The communications manager 1015 may be an example of aspects of the communications manager 1310 described herein.

The communications manager 1015, or its sub-components, may be implemented in hardware, code (e.g., software) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
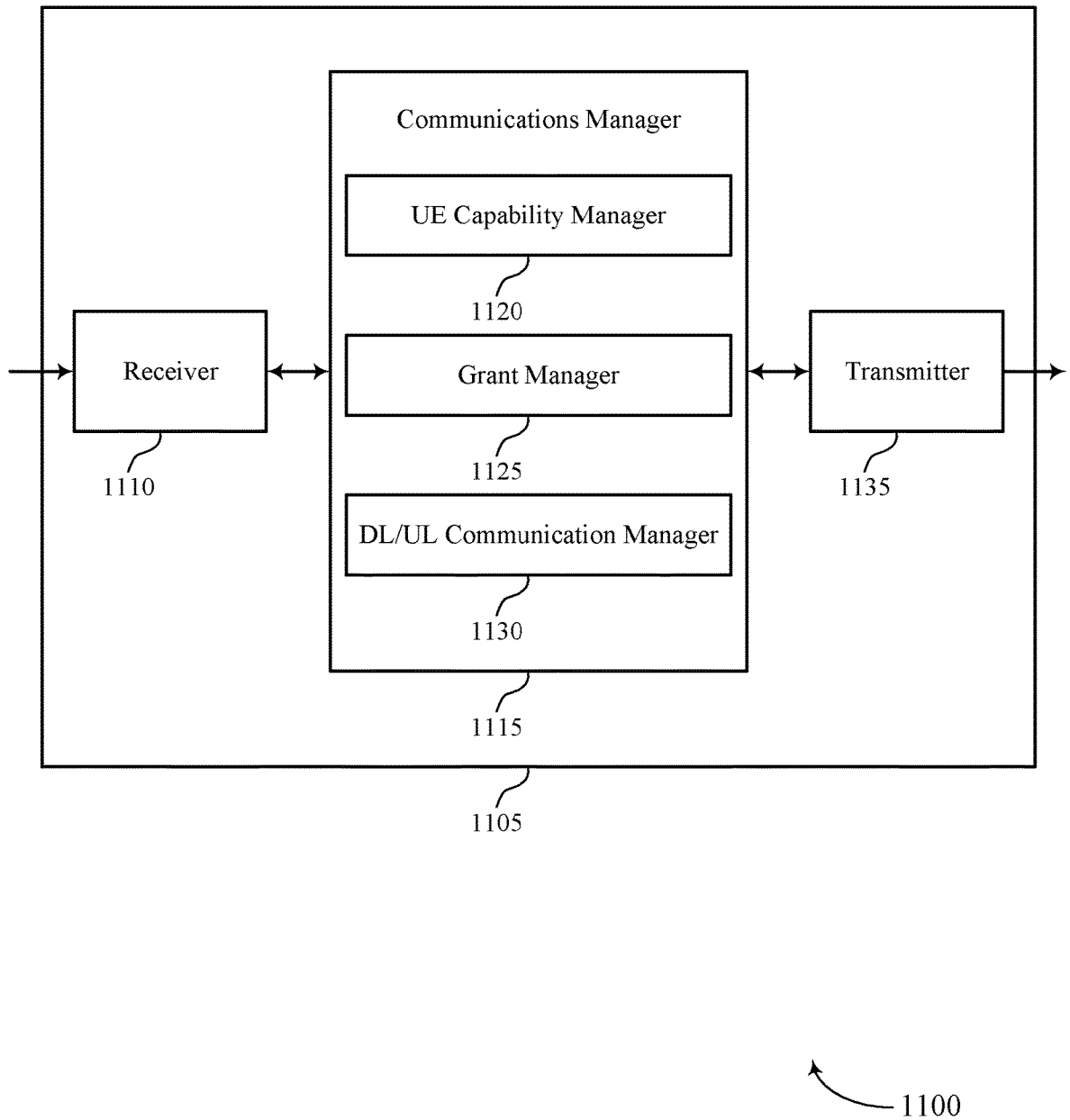

FIG. 11 shows a block diagram 1100 of a device 1105 that supports PDCCH resources for reduced capability UE in accordance with aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to PDCCH resources for reduced capability UE). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an UE capability manager 1120, a grant manager 1125, and a DL/UL communication manager 1130. The communications manager 1115 may be an example of aspects of the communications manager 1310 described herein.

The UE capability manager 1120 may transmit a UE capability message to a base station, the UE capability message including an indication of a UE type, the UE type associated with at least one of a reduced bandwidth, or a reduced number of antennas, or a combination thereof, for the UE.

The grant manager 1125 may monitor, based on a control resource set that is based on the UE type, a control channel for a downlink grant for downlink resources and receive, based on the monitoring, a grant identifying the downlink resources for communicating with the base station.

The DL/UL communication manager 1130 may communicate with the base station using the identified downlink resources.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
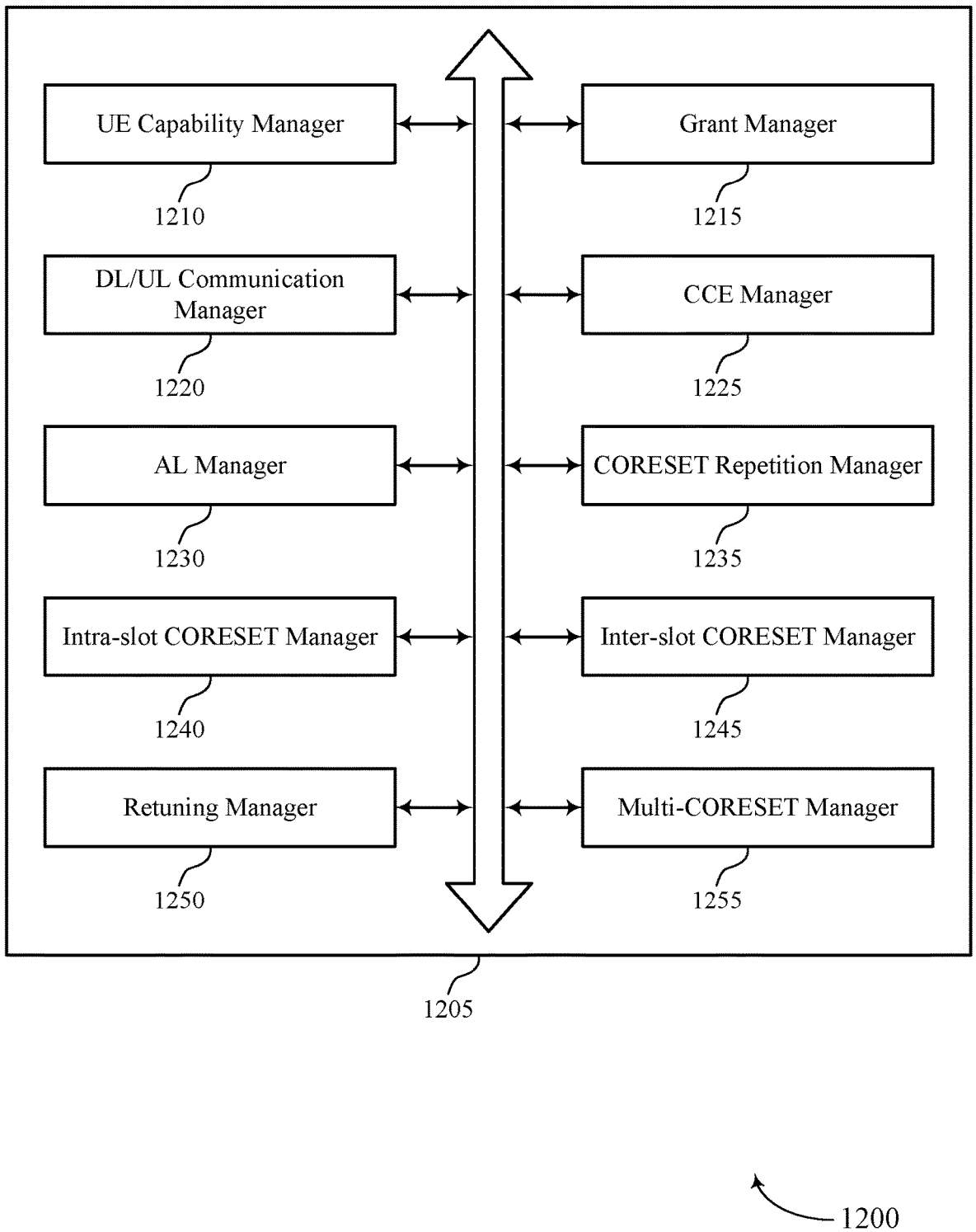
FIG. 12 shows a block diagram of a communications manager that supports PDCCH resources for reduced capability UE in accordance with aspects of the present disclosure.

FIG. 12 shows a block diagram 1200 of a communications manager 1205 that supports PDCCH resources for reduced capability UE in accordance with aspects of the present disclosure. The communications manager 1205 may be an example of aspects of a communications manager 1015, a communications manager 1115, or a communications manager 1310 described herein. The communications manager 1205 may include an UE capability manager 1210, a grant manager 1215, a DL/UL communication manager 1220, a CCE manager 1225, an AL manager 1230, a CORESET repetition manager 1235, an intra-slot CORESET manager 1240, an inter-slot CORESET manager 1245, a retuning manager 1250, and a multi-CORESET manager 1255. Each of these modules may communicate, directly or indirectly, with one another (e.g., via one or more buses).

The UE capability manager 1210 may transmit a UE capability message to a base station, the UE capability message including an indication of a UE type, the UE type associated with at least one of a reduced bandwidth, or a reduced number of antennas, or a combination thereof, for the UE.

The grant manager 1215 may monitor, based on a control resource set that is based on the UE type, a control channel for a downlink grant for downlink resources. In some examples, the grant manager 1215 may receive, based on the monitoring, a grant identifying the downlink resources for communicating with the base station.

The DL/UL communication manager 1220 may communicate with the base station using the identified downlink resources.

The CCE manager 1225 may identify a number of CCEs using a set of different ALs in the control resource set. In some examples, the CCE manager 1225 may select an AL to receive the grant based on the UE type.

The AL manager 1230 may identify a number of CCEs using a set of different ALs in the control resource set. In some examples, selecting a number of symbols in a slot for the control channel to receive the grant based on the number of CCEs, where the number of symbols includes three or more symbols in the slot.

In some examples, the AL manager 1230 may reduce a bandwidth of the control channel for the UE based on the UE type. In some examples, the AL manager 1230 may select a REG bundling size based on a number of symbols for the control resource set. In some cases, the number of selected symbols in the slot is an integer division of a number of REGs for the CCEs.

The CORESET repetition manager 1235 may receive, based on the control resource set, the grant during a first set of symbols of a slot. In some examples, the CORESET repetition manager 1235 may receive, based on the control resource set, a repetition of the grant during a second set of symbols of the slot, the first set of symbols and the second set of symbols including contiguous or non-contiguous symbols of the slot.

In some examples, the CORESET repetition manager 1235 may receive, based on the control resource set, the grant during a first slot and using a first bandwidth part.

In some examples, the CORESET repetition manager 1235 may receive, based on the control resource set, a repetition of the grant during a second slot that is different from the first slot and using a second bandwidth part that is different from the first bandwidth part. In some cases, the repetition of the grant in the second set of symbols is received using a same parameter set as the grant in received in the first set of symbols. In some cases, the repetition of the grant using the second bandwidth part is based at least in part on a bandwidth part offset configured according to the control resource set.

The intra-slot CORESET manager 1240 may receive, based on the control resource set, a first portion of the grant during a first slot. In some examples, the intra-slot CORESET manager 1240 may receive, based on the control resource set, a second portion of the grant during a second slot that is different from the first slot. In some examples, the intra-slot CORESET manager 1240 may receive, based on the control resource set, the grant during a first slot and using a first set of subbands of a bandwidth part.

In some examples, the intra-slot CORESET manager 1240 may receive, based on the control resource set, a repetition of the grant during a second slot that is different from the first slot and using a second set of subbands of the bandwidth part that are different from the first set of subbands. In some cases, the repetition of the grant during the second slot is based at least in part on a resource block offset configured according to the control resource set.

The inter-slot CORESET manager 1245 may receive, based on the control resource set, the grant during a first slot. In some examples, the inter-slot CORESET manager 1245 may receive, based on the control resource set, a repetition of the grant during a second slot that is different from the first slot.

The retuning manager 1250 may perform a retuning operation from the first bandwidth part to the second bandwidth part during a configured retuning gap configured not during a first symbol of the second slot.

The multi-CORESET manager 1255 may receive, based on a first control resource set, a first portion of the grant. In some examples, the multi-CORESET manager 1255 may receive, based on a second control resource set that is different from the first control resource set, a second portion of the grant. In some examples, the multi-CORESET manager 1255 may combine the first portion of the grant and the second portion of the grant to receive the grant.

In some cases, the first control resource set is associated with a first slot and the second control resource set is associated with a second slot that is different from the first slot.

Figure 13:
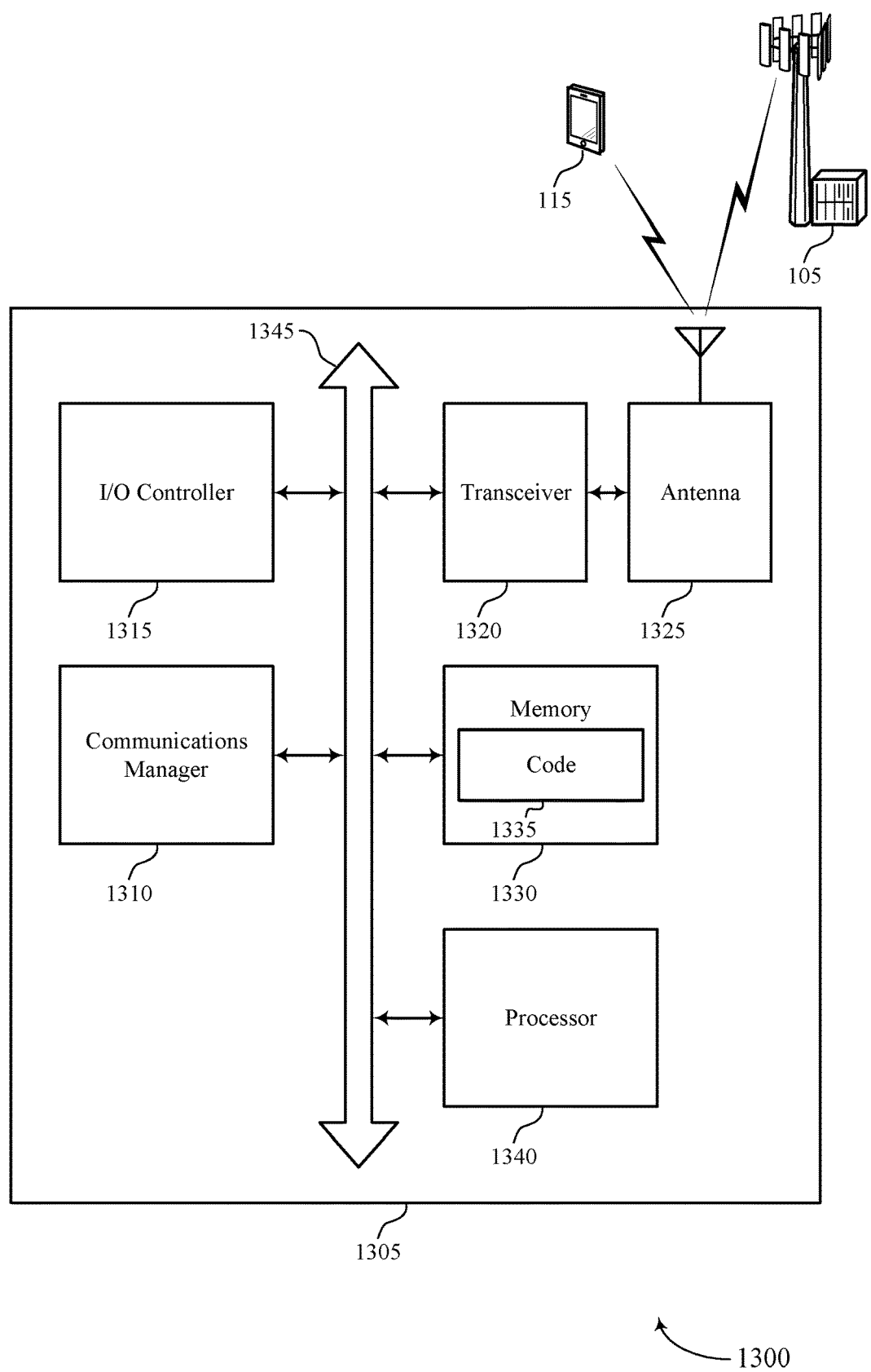
FIG. 13 shows a diagram of a system including a device that supports PDCCH resources for reduced capability UE in accordance with aspects of the present disclosure.

FIG. 13 shows a diagram of a system 1300 including a device 1305 that supports PDCCH resources for reduced capability UE in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may transmit a UE capability message to a base station, the UE capability message including an indication of a UE type, the UE type associated with at least one of a reduced bandwidth, or a reduced number of antennas, or a combination thereof, for the UE, monitor, based on a control resource set that is based on the UE type, a control channel for a downlink grant for downlink resources, receive, based on the monitoring, a grant identifying the downlink resources for communicating with the base station, and communicate with the base station using the identified downlink resources.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting PDCCH resources for reduced capability UE).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
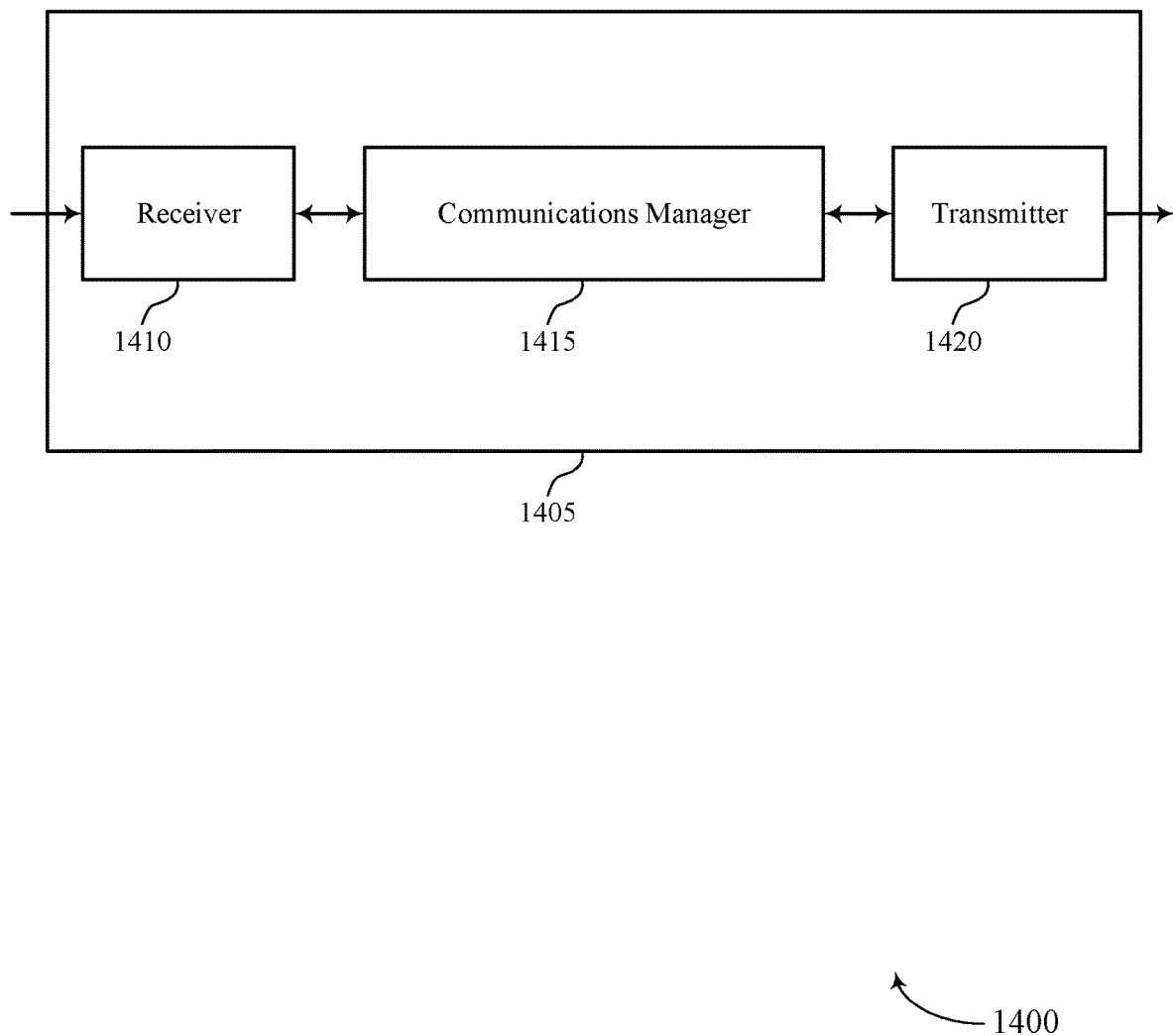
FIGS. 14 and 15 show block diagrams of devices that support PDCCH resources for reduced capability UE in accordance with aspects of the present disclosure.

FIG. 14 shows a block diagram 1400 of a device 1405 that supports PDCCH resources for reduced capability UE in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to PDCCH resources for reduced capability UE). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may receive a UE capability message from a UE, the UE capability message including an indication of a UE type, the UE type associated with at least one of a reduced bandwidth, or a reduced number of antennas, or a combination thereof, for the UE, select, based on the UE type, a control resource set for a control channel for the UE to monitor, transmit a grant identifying downlink resources for communicating with the UE according to the control resource set, and communicate with the UE using the identified downlink resources. The communications manager 1415 may be an example of aspects of the communications manager 1710 described herein.

The communications manager 1415, or its sub-components, may be implemented in hardware, code (e.g., software) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
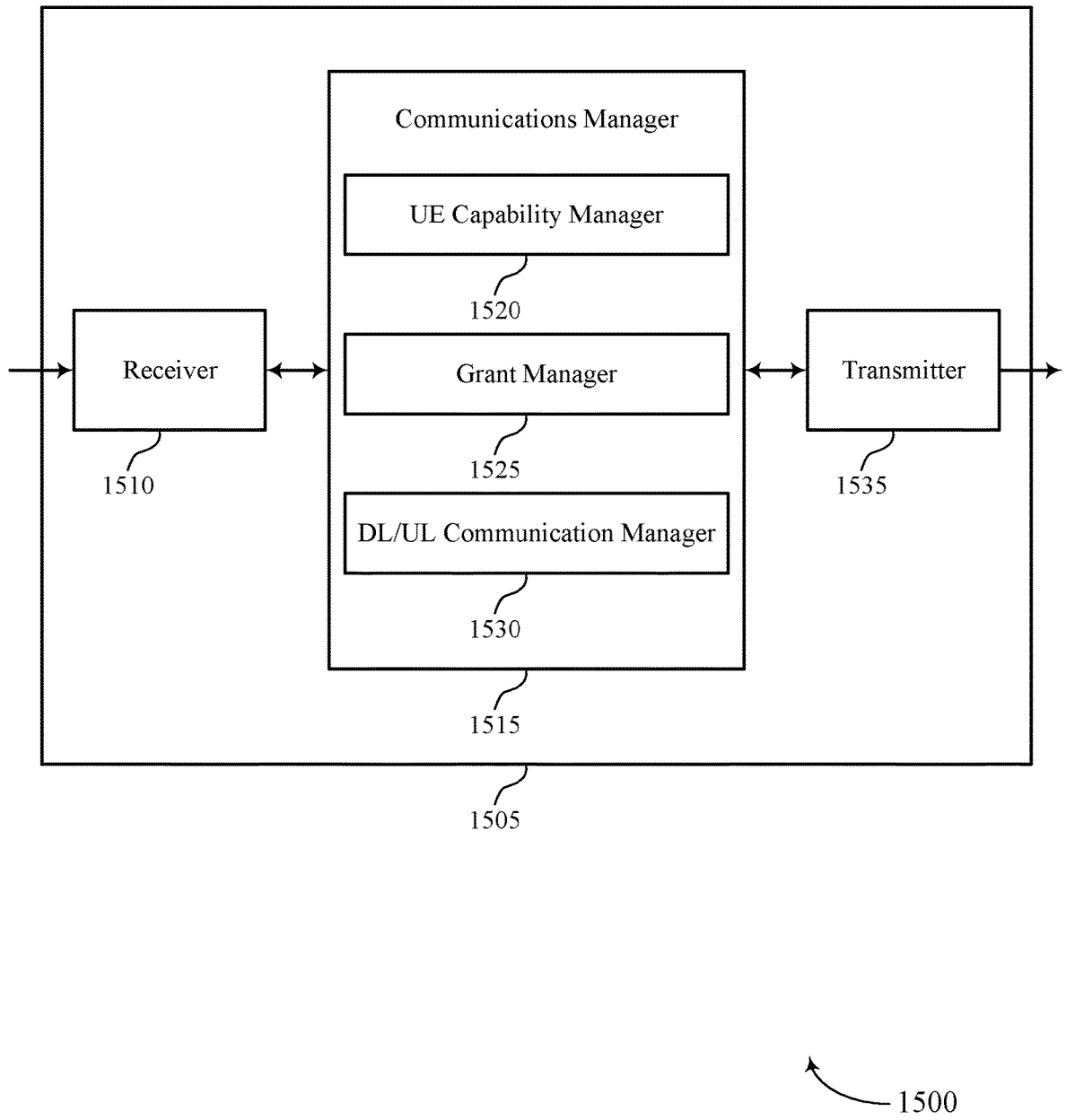

FIG. 15 shows a block diagram 1500 of a device 1505 that supports PDCCH resources for reduced capability UE in accordance with aspects of the present disclosure. The device 1505 may be an example of aspects of a device 1405, or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to PDCCH resources for reduced capability UE). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include an UE capability manager 1520, a grant manager 1525, and a DL/UL communication manager 1530. The communications manager 1515 may be an example of aspects of the communications manager 1710 described herein.

The UE capability manager 1520 may receive a UE capability message from a UE, the UE capability message including an indication of a UE type, the UE type associated with at least one of a reduced bandwidth, or a reduced number of antennas, or a combination thereof, for the UE.

The grant manager 1525 may select, based on the UE type, a control resource set for a control channel for the UE to monitor and transmit a grant identifying downlink resources for communicating with the UE according to the control resource set.

The DL/UL communication manager 1530 may communicate with the UE using the identified downlink resources.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
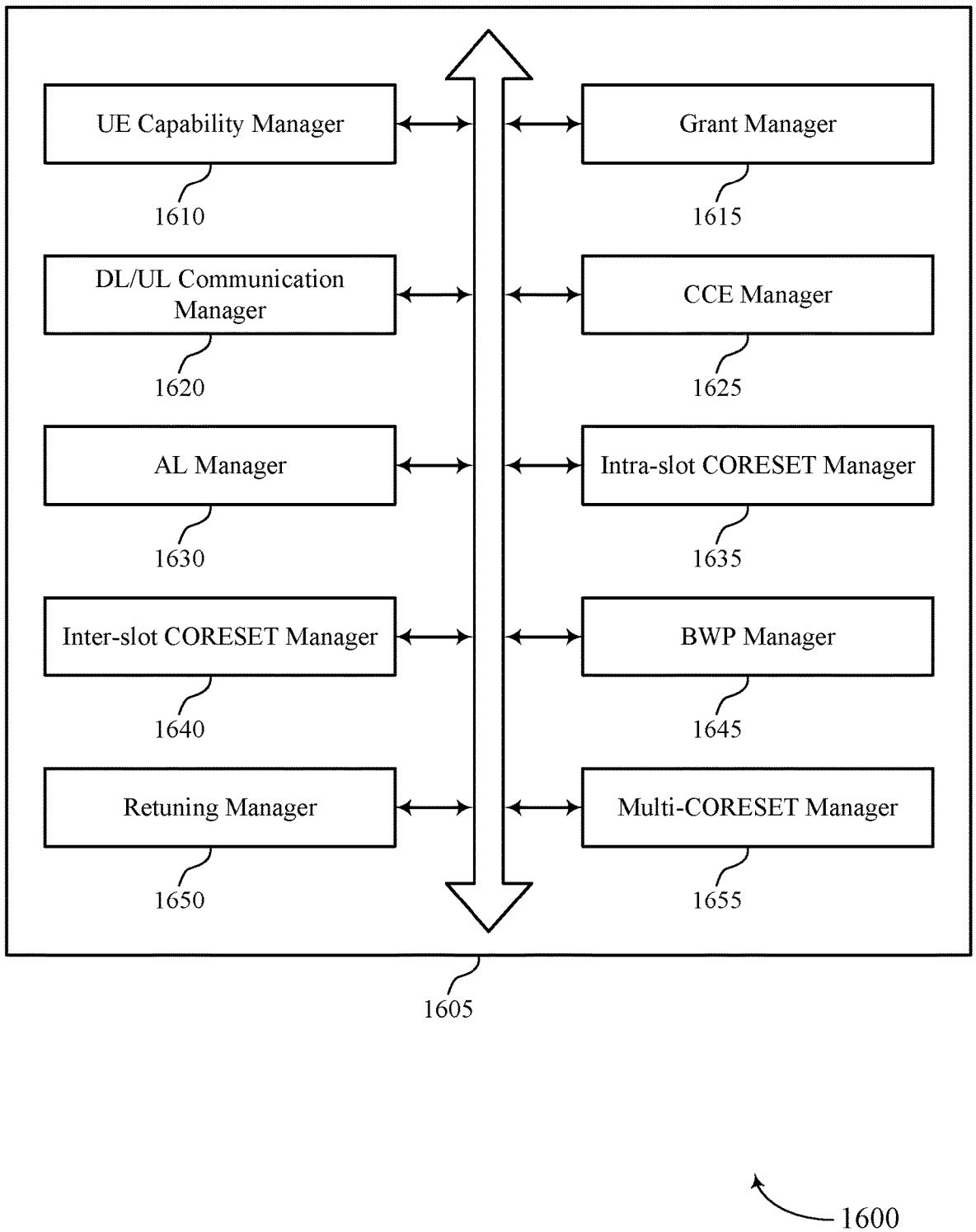
FIG. 16 shows a block diagram of a communications manager that supports PDCCH resources for reduced capability UE in accordance with aspects of the present disclosure.

FIG. 16 shows a block diagram 1600 of a communications manager 1605 that supports PDCCH resources for reduced capability UE in accordance with aspects of the present disclosure. The communications manager 1605 may be an example of aspects of a communications manager 1415, a communications manager 1515, or a communications manager 1710 described herein. The communications manager 1605 may include an UE capability manager 1610, a grant manager 1615, a DL/UL communication manager 1620, a CCE manager 1625, an AL manager 1630, an intra-slot CORESET manager 1635, an inter-slot CORESET manager 1640, a BWP manager 1645, a retuning manager 1650, and a multi-CORESET manager 1655. Each of these modules may communicate, directly or indirectly, with one another (e.g., via one or more buses).

The UE capability manager 1610 may receive a UE capability message from a UE, the UE capability message including an indication of a UE type, the UE type associated with at least one of a reduced bandwidth, or a reduced number of antennas, or a combination thereof, for the UE.

The grant manager 1615 may select, based on the UE type, a control resource set for a control channel for the UE to monitor. In some examples, the grant manager 1615 may transmit a grant identifying downlink resources for communicating with the UE according to the control resource set.

The DL/UL communication manager 1620 may communicate with the UE using the identified downlink resources.

The CCE manager 1625 may identify a number of CCEs using a set of different ALs in the control resource set. In some examples, the CCE manager 1625 may select an AL to transmit the grant based on the UE type.

The AL manager 1630 may identify a number of CCEs using a set of different ALs in the control resource set. In some examples, selecting a number of symbols in a slot for the control channel to transmit the grant based on the number of CCEs, where the number of symbols includes three or more symbols in the slot.

In some examples, the AL manager 1630 may reduce a bandwidth of the control channel for the UE based on the UE type. In some examples, the AL manager 1630 may select a REG bundling size based on a number of symbols for the control resource set. In some cases, the number of selected symbols in the slot is an integer division of a number of REGs for the CCEs.

The intra-slot CORESET manager 1635 may transmit, based on the control resource set, the grant during a first set of symbols of a slot. In some examples, the intra-slot CORESET manager 1635 may transmit, based on the control resource set, a repetition of the grant during a second set of symbols of the slot, the first set of symbols and the second set of symbols including contiguous or non-contiguous symbols of the slot. In some cases, the repetition of the grant in the second set of symbols is transmitted using a same parameter set as the grant transmitted in the first set of symbols.

The inter-slot CORESET manager 1640 may transmit, based on the control resource set, a first portion of the grant during a first slot. In some examples, the inter-slot CORESET manager 1640 may transmit, based on the control resource set, a second portion of the grant during a second slot that is different from the first slot. In some examples, the inter-slot CORESET manager 1640 may transmit, based on the control resource set, the grant during a first slot.

In some examples, the inter-slot CORESET manager 1640 may transmit, based on the control resource set, a repetition of the grant during a second slot that is different from the first slot. In some examples, the inter-slot CORESET manager 1640 may transmit, based on the control resource set, the grant during a first slot and using a first set of subbands of a bandwidth part. In some examples, the inter-slot CORESET manager 1640 may transmit, based on the control resource set, a repetition of the grant during a second slot that is different from the first slot and using a second set of subbands of the bandwidth part that are different from the first set of subbands. In some cases, the repetition of the grant during the second slot is based at least in part on a resource block offset configured according to the control resource set.

The BWP manager 1645 may transmit, based on the control resource set, the grant during a first slot and using a first bandwidth part. In some examples, the BWP manager 1645 may transmit, based on the control resource set, a repetition of the grant during a second slot that is different from the first slot and using a second bandwidth part that is different from the first bandwidth part. In some cases, the repetition of the grant using the second bandwidth part is based at least in part on a bandwidth part offset configured according to the control resource set.

The retuning manager 1650 may configure a retuning gap during not during a first symbol of the second slot for the UE to perform a retuning operation from the first bandwidth part to the second bandwidth part.

The multi-CORESET manager 1655 may transmit, based on a first control resource set, a first portion of the grant. In some examples, the multi-CORESET manager 1655 may transmit, based on a second control resource set that is different from the first control resource set, a second portion of the grant, where the first portion of the grant and the second portion of the grant are combined to transmit the grant. In some cases, the first control resource set is associated with a first slot and the second control resource set is associated with a second slot that is different from the first slot.

Figure 17:
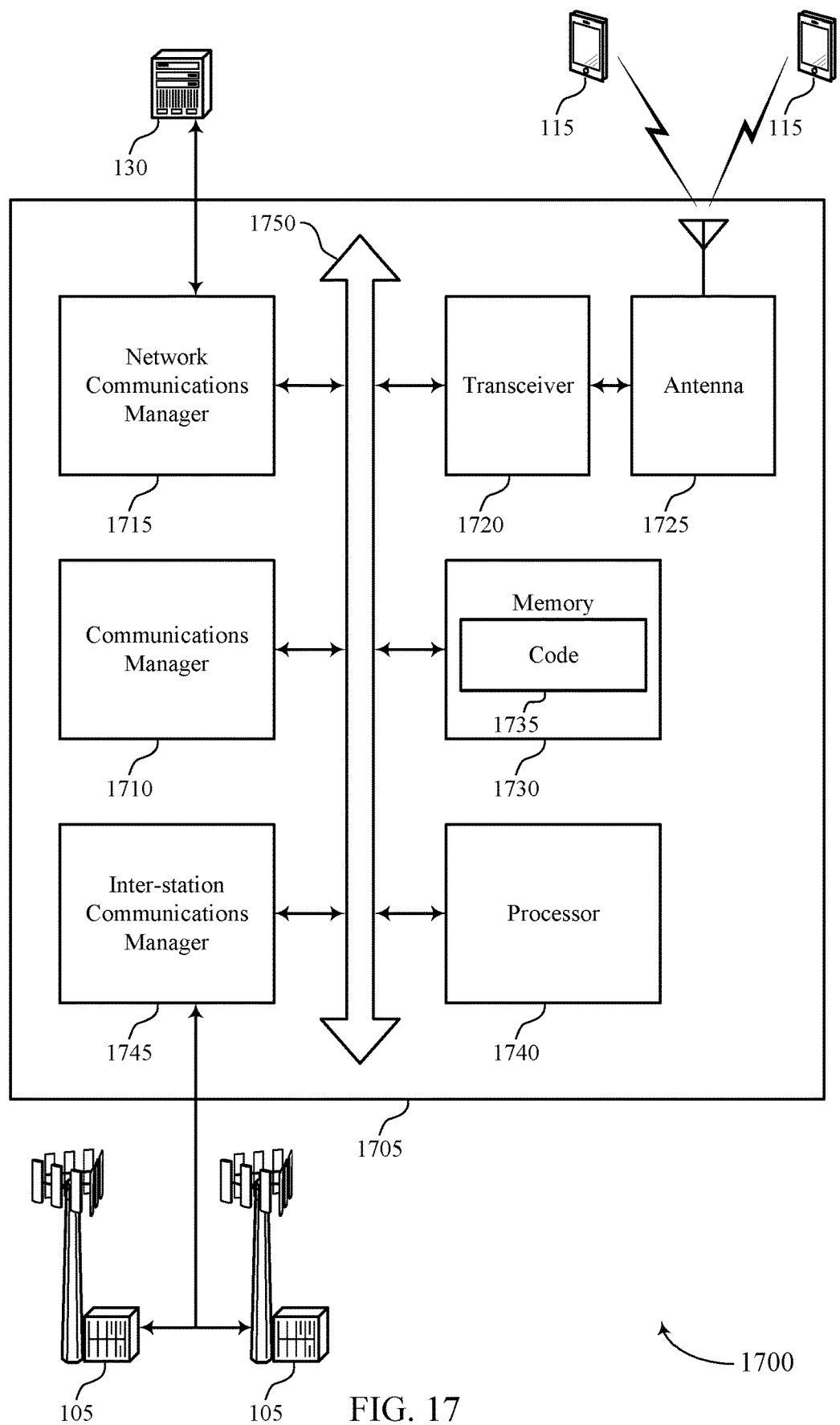
FIG. 17 shows a diagram of a system including a device that supports PDCCH resources for reduced capability UE in accordance with aspects of the present disclosure.

FIG. 17 shows a diagram of a system 1700 including a device 1705 that supports PDCCH resources for reduced capability UE in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may receive a UE capability message from a UE, the UE capability message including an indication of a UE type, the UE type associated with at least one of a reduced bandwidth, or a reduced number of antennas, or a combination thereof, for the UE, select, based on the UE type, a control resource set for a control channel for the UE to monitor, transmit a grant identifying downlink resources for communicating with the UE according to the control resource set, and communicate with the UE using the identified downlink resources.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting PDCCH resources for reduced capability UE).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
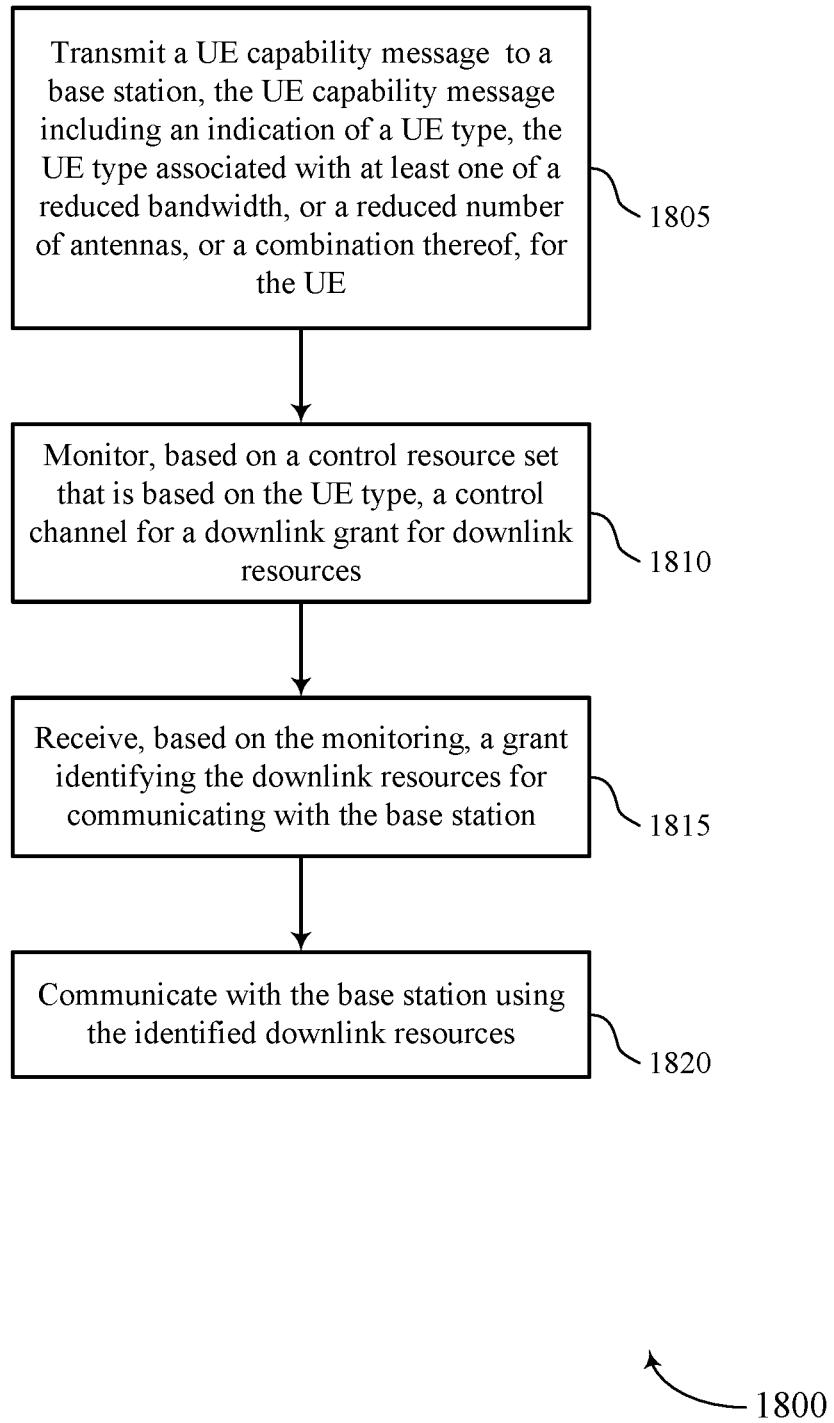
FIGS. 18 through 21 show flowcharts illustrating methods that support PDCCH resources for reduced capability UE in accordance with aspects of the present disclosure.

FIG. 18 shows a flowchart illustrating a method 1800 that supports PDCCH resources for reduced capability UE in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may transmit a UE capability message to a base station, the UE capability message including an indication of a UE type, the UE type associated with at least one of a reduced bandwidth, or a reduced number of antennas, or a combination thereof, for the UE. The operations of 1805 may be performed according to the methods described herein. In some examples, aspects of the operations of 1805 may be performed by an UE capability manager as described with reference to FIGS. 10 through 13.

At 1810, the UE may monitor, based on a control resource set that is based on the UE type, a control channel for a downlink grant for downlink resources. The operations of 1810 may be performed according to the methods described herein. In some examples, aspects of the operations of 1810 may be performed by a grant manager as described with reference to FIGS. 10 through 13.

At 1815, the UE may receive, based on the monitoring, a grant identifying the downlink resources for communicating with the base station. The operations of 1815 may be performed according to the methods described herein. In some examples, aspects of the operations of 1815 may be performed by a grant manager as described with reference to FIGS. 10 through 13.

At 1820, the UE may communicate with the base station using the identified downlink resources. The operations of 1820 may be performed according to the methods described herein. In some examples, aspects of the operations of 1820 may be performed by a DL/UL communication manager as described with reference to FIGS. 10 through 13.

Figure 19:
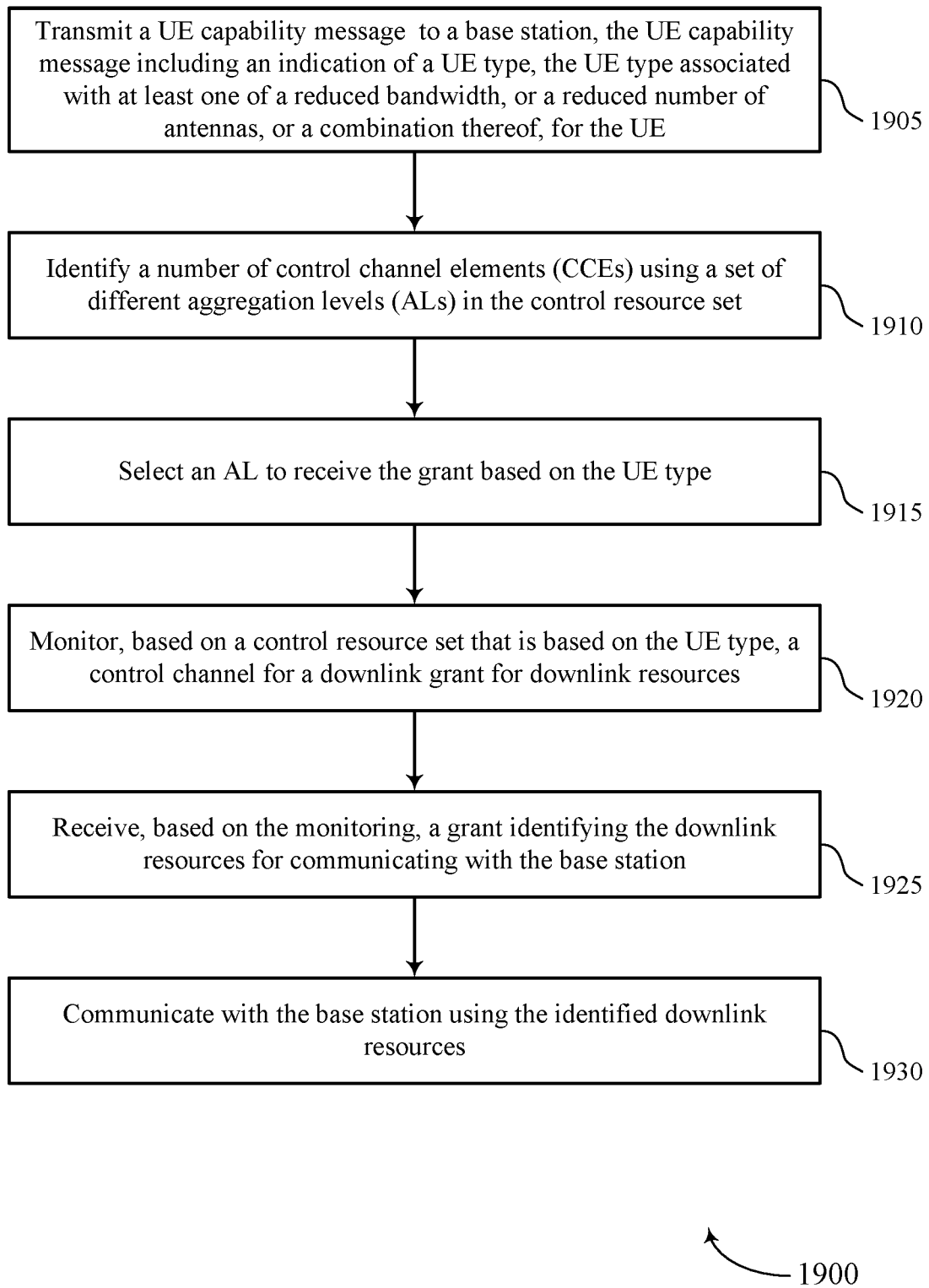

FIG. 19 shows a flowchart illustrating a method 1900 that supports PDCCH resources for reduced capability UE in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may transmit a UE capability message to a base station, the UE capability message including an indication of a UE type, the UE type associated with at least one of a reduced bandwidth, or a reduced number of antennas, or a combination thereof, for the UE. The operations of 1905 may be performed according to the methods described herein. In some examples, aspects of the operations of 1905 may be performed by an UE capability manager as described with reference to FIGS. 10 through 13.

At 1910, the UE may identify a number of CCEs using a set of different ALs in the control resource set. The operations of 1910 may be performed according to the methods described herein. In some examples, aspects of the operations of 1910 may be performed by a CCE manager as described with reference to FIGS. 10 through 13.

At 1915, the UE may select an AL to receive the grant based on the UE type. The operations of 1915 may be performed according to the methods described herein. In some examples, aspects of the operations of 1915 may be performed by a CCE manager as described with reference to FIGS. 10 through 13.

At 1920, the UE may monitor, based on a control resource set that is based on the UE type, a control channel for a downlink grant for downlink resources. The operations of 1920 may be performed according to the methods described herein. In some examples, aspects of the operations of 1920 may be performed by a grant manager as described with reference to FIGS. 10 through 13.

At 1925, the UE may receive, based on the monitoring, a grant identifying the downlink resources for communicating with the base station. The operations of 1925 may be performed according to the methods described herein. In some examples, aspects of the operations of 1925 may be performed by a grant manager as described with reference to FIGS. 10 through 13.

At 1930, the UE may communicate with the base station using the identified downlink resources. The operations of 1930 may be performed according to the methods described herein. In some examples, aspects of the operations of 1930 may be performed by a DL/UL communication manager as described with reference to FIGS. 10 through 13.

Figure 20:
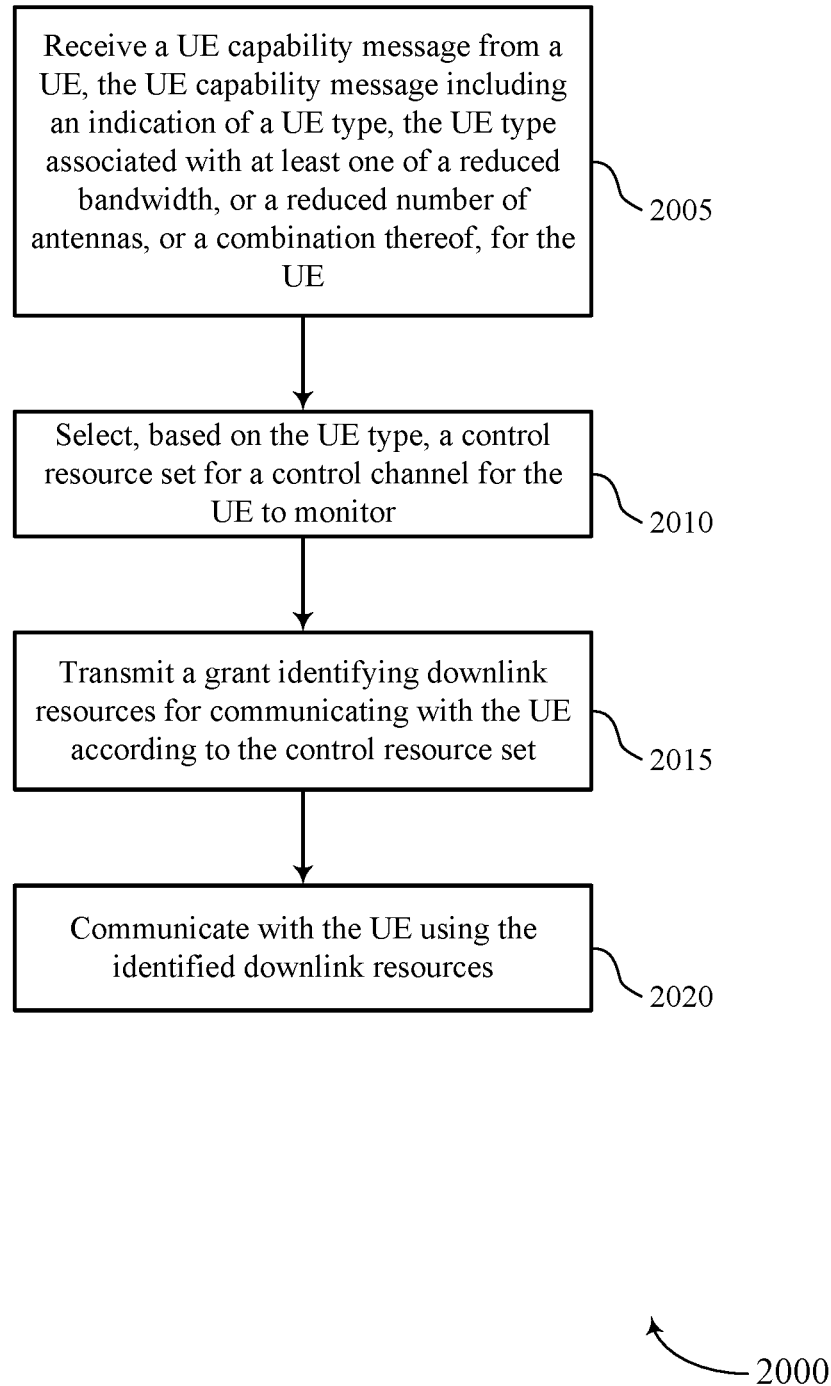

FIG. 20 shows a flowchart illustrating a method 2000 that supports PDCCH resources for reduced capability UE in accordance with aspects of the present disclosure. The operations of method 2000 may be implemented by a base station 105 or its components as described herein. For example, the operations of method 2000 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2005, the base station may receive a UE capability message from a UE, the UE capability message including an indication of a UE type, the UE type associated with at least one of a reduced bandwidth, or a reduced number of antennas, or a combination thereof, for the UE. The operations of 2005 may be performed according to the methods described herein. In some examples, aspects of the operations of 2005 may be performed by an UE capability manager as described with reference to FIGS. 14 through 17.

At 2010, the base station may select, based on the UE type, a control resource set for a control channel for the UE to monitor. The operations of 2010 may be performed according to the methods described herein. In some examples, aspects of the operations of 2010 may be performed by a grant manager as described with reference to FIGS. 14 through 17.

At 2015, the base station may transmit a grant identifying downlink resources for communicating with the UE according to the control resource set. The operations of 2015 may be performed according to the methods described herein. In some examples, aspects of the operations of 2015 may be performed by a grant manager as described with reference to FIGS. 14 through 17.

At 2020, the base station may communicate with the UE using the identified downlink resources. The operations of 2020 may be performed according to the methods described herein. In some examples, aspects of the operations of 2020 may be performed by a DL/UL communication manager as described with reference to FIGS. 14 through 17.

Figure 21:
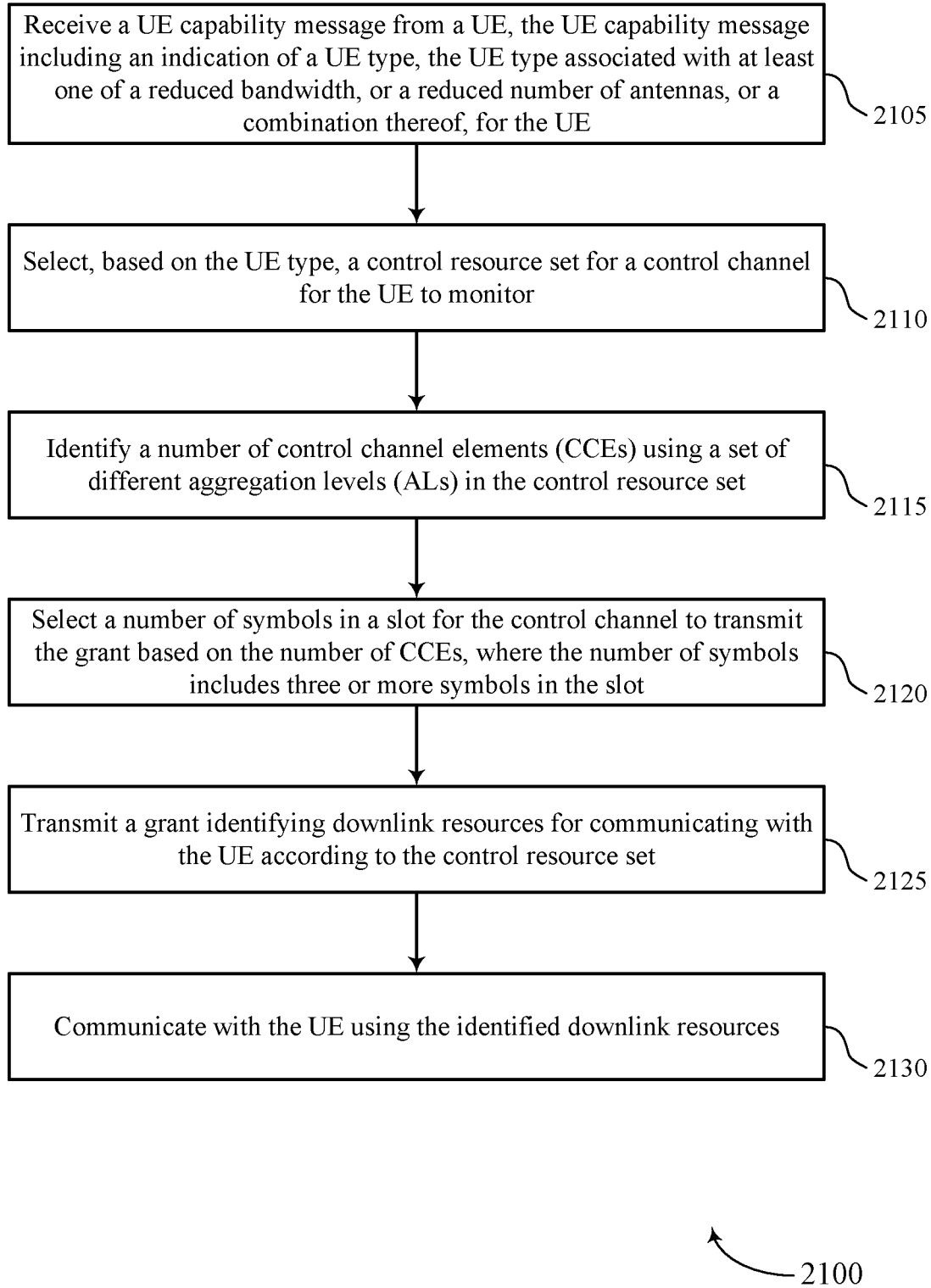

FIG. 21 shows a flowchart illustrating a method 2100 that supports PDCCH resources for reduced capability UE in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2105, the base station may receive a UE capability message from a UE, the UE capability message including an indication of a UE type, the UE type associated with at least one of a reduced bandwidth, or a reduced number of antennas, or a combination thereof, for the UE. The operations of 2105 may be performed according to the methods described herein. In some examples, aspects of the operations of 2105 may be performed by an UE capability manager as described with reference to FIGS. 14 through 17.

At 2110, the base station may select, based on the UE type, a control resource set for a control channel for the UE to monitor. The operations of 2110 may be performed according to the methods described herein. In some examples, aspects of the operations of 2110 may be performed by a grant manager as described with reference to FIGS. 14 through 17.

At 2115, the base station may identify a number of CCEs using a set of different ALs in the control resource set. The operations of 2115 may be performed according to the methods described herein. In some examples, aspects of the operations of 2115 may be performed by an AL manager as described with reference to FIGS. 14 through 17.

At 2120, the base station may select a number of symbols in a slot for the control channel to transmit the grant based on the number of CCEs, where the number of symbols includes three or more symbols in the slot. The operations of 2120 may be performed according to the methods described herein. In some examples, aspects of the operations of 2120 may be performed by an AL manager as described with reference to FIGS. 14 through 17.

At 2125, the base station may transmit a grant identifying downlink resources for communicating with the UE according to the control resource set. The operations of 2125 may be performed according to the methods described herein. In some examples, aspects of the operations of 2125 may be performed by a grant manager as described with reference to FIGS. 14 through 17.

At 2130, the base station may communicate with the UE using the identified downlink resources. The operations of 2130 may be performed according to the methods described herein. In some examples, aspects of the operations of 2130 may be performed by a DL/UL communication manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000 or Universal Terrestrial Radio Access (UTRA). CDMA2000 covers IS-2000, IS-95, and IS-856 standards. IS-2000 Releases may be commonly referred to as CDMA2000 1x, or 1X. IS-856 (TIA-856) is commonly referred to as CDMA2000 1xEV-DO or High Rate Packet Data. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, or Flash-OFDM. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An base station for a macro cell may be referred to as a macro base station (e.g., macro eNB or gNB). A base station for a small cell may be referred to as a small cell base station (e.g., small cell eNB or small cell gNB), a pico base station (e.g., pico eNB or pico gNB), a femto base station (e.g., femto eNB or femto gNB), or a home base station (e.g., home eNB or home gNB). An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, and functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting a UE capability message to a network device, the UE capability message including an indication of a UE type, the UE type identifying the UE as a reduced capability UE associated with at least one of a reduced bandwidth for the UE, or a reduced quantity of antennas for the UE, or a combination thereof;
   selecting, at the UE, an aggregation level (AL) to receive a downlink grant based at least in part on the UE type and based at least in part on a quantity of control channel elements (CCEs) using a plurality of different ALs in a control resource set that is associated with reduced capability UEs;

monitoring, based at least in part on the control resource set, a control channel for the downlink grant;

receiving, based at least in part on the monitoring, a first portion of the downlink grant during a first two symbols of a first slot, the first slot comprising a first plurality of symbols, and the downlink grant identifying downlink resources for communicating with the network device;

receiving, based at least in part on the monitoring, a second portion of the downlink grant during a first two symbols of a second slot that is different from the first slot, the second slot comprising a second plurality of symbols; and communicating with the network device using the identified downlink resources.

2. The method of claim 1, further comprising:
identifying the quantity of CCEs using the plurality of different ALs in the control resource set, wherein the AL is selected is based at least in part on the plurality of different ALs.

3. The method of claim 1, further comprising:
identifying the quantity of CCEs using the plurality of different ALs in the control resource set; and
selecting a quantity of symbols in a slot for the control channel to receive the downlink grant based at least in part on the quantity of CCEs, wherein the quantity of symbols comprises three or more symbols in the slot.

4. The method of claim 3, further comprising:
reducing a bandwidth of the control channel for the UE based at least in part on the UE type.

5. The method of claim 3, wherein the quantity of selected symbols in the slot is an integer division of a quantity of resource element groups REGs) for the CCEs.

6. The method of claim 5, further comprising:
selecting a REG bundling size based at least in part on a quantity of symbols for the control resource set.

7. The method of claim 1, wherein the second portion of the downlink grant comprises a repetition of the downlink grant.

8. The method of claim 1, wherein the second portion of the downlink grant comprises a repetition of the downlink grant, the method further comprising:
receiving, based at least in part on the control resource set, the downlink grant during the first slot and using a first set of subbands of a bandwidth part; and
receiving, based at least in part on the control resource set, the repetition of the downlink grant during the second slot that is different from the first slot and using a second set of subbands of the bandwidth part that are different from the first set of subbands.

9. The method of claim 8, wherein the repetition of the downlink grant during the second slot is based at least in part on a resource block offset configured according to the control resource set.

10. The method of claim 1, the second portion of the downlink grant comprises a repetition of the downlink grant, the method further comprising:
receiving, based at least in part on the control resource set, the downlink grant during the first slot and using a first bandwidth part; and
receiving, based at least in part on the control resource set, the repetition of the downlink grant during the second slot that is different from the first slot and using a second bandwidth part that is different from the first bandwidth part.

11. The method of claim 10, wherein the repetition of the downlink grant using the second bandwidth part is based at least in part on a bandwidth part offset configured according to the control resource set.

12. The method of claim 10, further comprising:
performing a retuning operation from the first bandwidth part to the second bandwidth part during a configured retuning gap configured not during a first symbol of the second slot.

13. The method of claim 1, further comprising:
combining the first portion of the downlink grant and the second portion of the downlink grant to receive the downlink grant.

14. The method of claim 1, wherein:
the first portion comprises first control information associated with the downlink grant, and
the second portion comprises second control information associated with the downlink grant different than the first control information.

15. A method for wireless communication at a network device, comprising:
receiving a user equipment (UE) capability message from a UE, the UE capability message including an indication of a UE type, the UE type identifying the UE as a reduced capability UE associated with at least one of a reduced bandwidth for the UE, or a reduced quantity of antennas for the UE, or a combination thereof;
selecting an aggregation level (AL) to transmit a downlink grant based at least in part on the UE type and based at least in part on a quantity of control channel elements (CCEs) using a plurality of different ALs in a control resource set that is associated with reduced capability UEs;
selecting, based at least in part on the UE type, the control resource set for a control channel for the UE to monitor;
transmitting, based at least in part on the control resource set, a first portion of the downlink grant during a first two symbols of a first slot, the first slot comprising a first plurality of symbols, and the downlink grant identifying downlink resources for communicating with the UE;
transmitting, based at least in part on the control resource set, a second portion of the downlink grant during a first two symbols of a second slot that is different from the first slot, the second slot comprising a second plurality of symbols; and
communicating with the UE using the identified downlink resources.

16. The method of claim 15, wherein:
the first portion comprises first control information associated with the downlink grant, and
the second portion comprises second control information associated with the downlink grant different than the first control information.

17. An apparatus for wireless communication at a user equipment (UE), comprising:
at least one processor; and
memory coupled to the at least one processor, the memory storing instructions executable by the at least one processor to cause the UE to:
transmit a UE capability message to a network device, the UE capability message including an indication of a UE type, the UE type identifying the UE as a reduced capability UE associated with at least one of a reduced bandwidth for the UE, or a reduced quantity of antennas for the UE, or a combination thereof, select, at the UE, an aggregation level (AL) to receive a downlink grant based at least in part on the UE type and based at least in part on a quantity of control channel elements (CCEs) using a plurality of different ALs in a control resource set that is associated with reduced capability UEs;

monitor, based at least in part on the control resource set, a control channel for the downlink grant;

receive, based at least in part on the monitoring, a first portion of the downlink grant during a first two symbols of a first slot, the first slot comprising a first plurality of symbols, and the downlink grant identifying downlink resources for communicating with the network device;

receive, based at least in part on the monitoring, a second portion of the downlink grant during a first two symbols of a second slot that is different from the first slot, the second slot comprising a second plurality of symbols; and communicate with the network device using the identified downlink resources.

18. The apparatus of claim 17, wherein the instructions are further executable by the at least one processor to cause the UE to:
identify the quantity of CCEs using the plurality of different ALs in the control resource set.

19. The apparatus of claim 17, wherein the instructions are further executable by the at least one processor to cause the UE to:
identify the quantity of CCEs using the plurality of different ALs in the control resource set; and
select a quantity of symbols in a slot for the control channel to receive the downlink grant based at least in part on the quantity of CCEs, wherein the quantity of symbols comprises three or more symbols in the slot.

20. The apparatus of claim 19, wherein the instructions are further executable by the at least one processor to cause the UE to:
reduce a bandwidth of the control channel for the UE based at least in part on the UE type.

21. The apparatus of claim 19, wherein the quantity of selected symbols in the slot is an integer division of a number of resource element groups (REGs) for the CCEs.

22. The apparatus of claim 21, wherein the instructions are further executable by the at least one processor to cause the UE to:
select a REG bundling size based at least in part on a quantity of symbols for the control resource set.

23. The apparatus of claim 17, wherein the second portion of the downlink grant comprises a repetition of the downlink grant.

24. The apparatus of claim 17, wherein the second portion of the downlink grant comprises a repetition of the downlink grant, and wherein the instructions are further executable by the at least one processor to cause the UE to:
receive, based at least in part on the control resource set, the downlink grant during the first slot and using a first set of subbands of a bandwidth part; and
receive, based at least in part on the control resource set, the repetition of the downlink grant during the second slot that is different from the first slot and using a second set of subbands of the bandwidth part that are different from the first set of subbands, wherein the repetition of the downlink grant during the second slot is based at least in part on a resource block offset configured according to the control resource set.

25. An apparatus for wireless communication at a network device, comprising:

at least one processor; and memory coupled to the at least one processor, the memory storing instructions executable by the at least one processor to cause the network device to:
receive a user equipment (UE) capability message from a UE, the UE capability message including an indication of a UE type, the UE type identifying the UE as a reduced capability UE associated with at least one of a reduced bandwidth for the UE, or a reduced quantity of antennas for the UE, or a combination thereof;

select an aggregation level (AL) to transmit a downlink grant based at least in part on the UE type and based at least in part on a quantity of control channel elements (CCEs) using a plurality of different ALs in a control resource set that is associated with reduced capability UEs;

select, based at least in part on the UE type, the control resource set for a control channel for the UE to monitor;

transmit, based at least in part on the control resource set, a first portion of the downlink grant during a first two symbols of a first slot, the first slot comprising a first plurality of symbols, and the downlink grant identifying downlink resources for communicating with the UE;

transmit, based at least in part on the control resource set, a second portion of the downlink grant during a first two symbols of a second slot that is different from the first slot, the second slot comprising a second plurality of symbols; and communicate with the UE using the identified downlink resources.

* * * * *